(12) United States Patent
Rieker

(10) Patent No.: US 12,090,736 B2
(45) Date of Patent: Sep. 17, 2024

(54) PACKAGING FILMS FROM RECYCLED PLASTICS

(71) Applicant: KBG Kunststoff Beteiligungen GmbH, Plettenberg (DE)

(72) Inventor: Frank Rieker, Plettenberg (DE)

(73) Assignee: KBG Kunststoff Beteiligungen GmbH (DE)

(*) Notice: Subject to any disclaimer, the term of this patent is extended or adjusted under 35 U.S.C. 154(b) by 151 days.

(21) Appl. No.: 17/796,872

(22) PCT Filed: Jan. 5, 2021

(86) PCT No.: PCT/EP2021/050062
§ 371 (c)(1),
(2) Date: Aug. 1, 2022

(87) PCT Pub. No.: WO2021/151627
PCT Pub. Date: Aug. 5, 2021

(65) Prior Publication Data
US 2023/0062044 A1    Mar. 2, 2023

(30) Foreign Application Priority Data

Jan. 31, 2020  (DE) .......................... 1020201024592
Feb. 6, 2020   (DE) .......................... 1020201030096
Feb. 11, 2020  (DE) .......................... 1020201033621

(51) Int. Cl.
| | | |
|---|---|---|
| B32B 27/32 | (2006.01) | |
| B32B 7/022 | (2019.01) | |
| B32B 7/023 | (2019.01) | |
| B32B 27/08 | (2006.01) | |
| B32B 27/20 | (2006.01) | |
| B32B 27/22 | (2006.01) | |

(52) U.S. Cl.
CPC .............. B32B 27/32 (2013.01); B32B 7/022 (2019.01); B32B 7/023 (2019.01); B32B 27/08 (2013.01);

(Continued)

(58) Field of Classification Search
CPC ....... B29C 48/10; B29C 48/21; B29C 48/277; B32B 1/08; B32B 2250/03;

(Continued)

(56) References Cited

U.S. PATENT DOCUMENTS

| | | |
|---|---|---|
| 5,128,212 A | 7/1992 | Kneale |
| 2007/0120283 A1 | 5/2007 | Hostetter |

(Continued)

FOREIGN PATENT DOCUMENTS

| | | |
|---|---|---|
| CN | 106433048 | 9/2018 |
| DE | 4234953 | 4/1994 |

(Continued)

OTHER PUBLICATIONS

HUG Technik und Sicherheit GmbH: Umrechnungstabelle Kunststoff-Tabelle. URL:https://www.hug-technik.com/inhalt/ta/kunststoff.html (Sep. 30, 2020).

(Continued)

*Primary Examiner* — Lawrence D Ferguson
(74) *Attorney, Agent, or Firm* — Edward E. Sowers; Brannon Sowers & Cracraft PC

(57) ABSTRACT

The invention relates to a multilayer plastic film, in particular a multilayer plastic composite film, preferably a multilayer plastic packaging film, based on plastic recyclate (recycled plastic), in particular based on plastic recyclate originating from waste, with a plastic recyclate content of at least 80% by weight, based on the plastic film, and to its use, in particular as packaging material. The plastic recyclate is preferably post-consumer plastic recyclate (PCR plastic recyclate), in particular PCR recycled films.

27 Claims, 1 Drawing Sheet

(52) U.S. Cl.
CPC .............. *B32B 27/20* (2013.01); *B32B 27/22* (2013.01); *B32B 2250/242* (2013.01); *B32B 2272/00* (2013.01); *B32B 2307/4026* (2013.01); *B32B 2307/41* (2013.01); *B32B 2307/412* (2013.01); *B32B 2307/54* (2013.01); *B32B 2307/581* (2013.01); *B32B 2307/732* (2013.01); *B32B 2307/734* (2013.01); *B32B 2307/744* (2013.01); *B32B 2439/06* (2013.01)

(58) Field of Classification Search
CPC .......... B32B 2250/242; B32B 2255/10; B32B 2264/10; B32B 2264/101; B32B 2264/102; B32B 2264/105; B32B 2264/12; B32B 2272/00; B32B 2307/4026; B32B 2307/406; B32B 2307/41; B32B 2307/412; B32B 2307/538; B32B 2307/54; B32B 2307/581; B32B 2307/732; B32B 2307/734; B32B 2307/744; B32B 2307/75; B32B 2410/00; B32B 2439/06; B32B 2439/40; B32B 2439/46; B32B 2553/00; B32B 27/08; B32B 27/16; B32B 27/20; B32B 27/22; B32B 27/32; B32B 27/36; B32B 37/15; B32B 7/02; B32B 7/022; B32B 7/023; B32B 7/025; B32B 7/12; C08J 11/04; Y02P 20/143; Y02P 70/10; Y02W 30/62; Y02W 30/80
See application file for complete search history.

(56) References Cited

U.S. PATENT DOCUMENTS

2012/0288692 A1 11/2012 Broyles
2016/0276105 A1 9/2016 Qi
2017/0002116 A1 1/2017 Layman

FOREIGN PATENT DOCUMENTS

DE 10060523 6/2001
DE 202017106797 11/2017
EP 2668105 5/2015
EP 3483206 8/2020

OTHER PUBLICATIONS

Triboplast: Reibungswerte und Verschleiß von Kunststoffen., URL: https://www.triboplast.de/reibungswerte-und-verschleiss (Sep. 30, 2020).

In Wikipedia. Die freie Enzyklopädie. Bearbeitungsstand: Nov. 4, 2019 URL: https://de.wikipedia.org/w/index.php?title=Sack&oldidO193743871 (Sep. 30, 2020).

"Recycling von Kunststoffen", Recyclingtechnik: Fachbuch für Lehre und Praxis, Wiesbaden, Springer Fachmedien Wiesbaden, (Jan. 1, 2016), pp. 271-273, ISBN 978-3-658-02786-5, XP093002842 (Martens et al.).

"Blauer Engel Produkte aus Recycling-Kunststoffen DE-UZ 30a Vergabekriterien", Blauer Engel Produkte aus Recycling-Kunststoffen DE-ZU 30a Vergabekriterien, (Mar. 1, 2016), Blauer Engel Produkte aus Recycling-Kunststoffen DE-ZU 30a, Vergabekriterien, (Nov. 29, 2022), XP093002849 (Umweltzeichen).

"Produktanforderung zur Ausschreibung Öko-Müllbeutel mit Zugband 60L", Edeka, (Mar. 7, 2018), Edeka, (Nov. 30, 2022), XP093003351, Anonymous.

"NorDiFill®—ECO 80", Nordfolien, (May 15, 2018), Nordfolien, (Nov. 30, 2022), XP093003354, Anonymous.

"Schäfer-Etiketten: PE-Folienetikett komplett aus Recyclat-Gemeinsame Entwicklung mit Herma und Polifilm", plasticker the home of plastics, (Jun. 7, 2019), , XP093003362, Anonymous.

"Erstes PE-Folienetikett komplett aus Recyclat", neue Verpackung, (Jun. 4, 2019), Neue Verpackung, (Nov. 30, 2022), XP093003363, Anonymous.

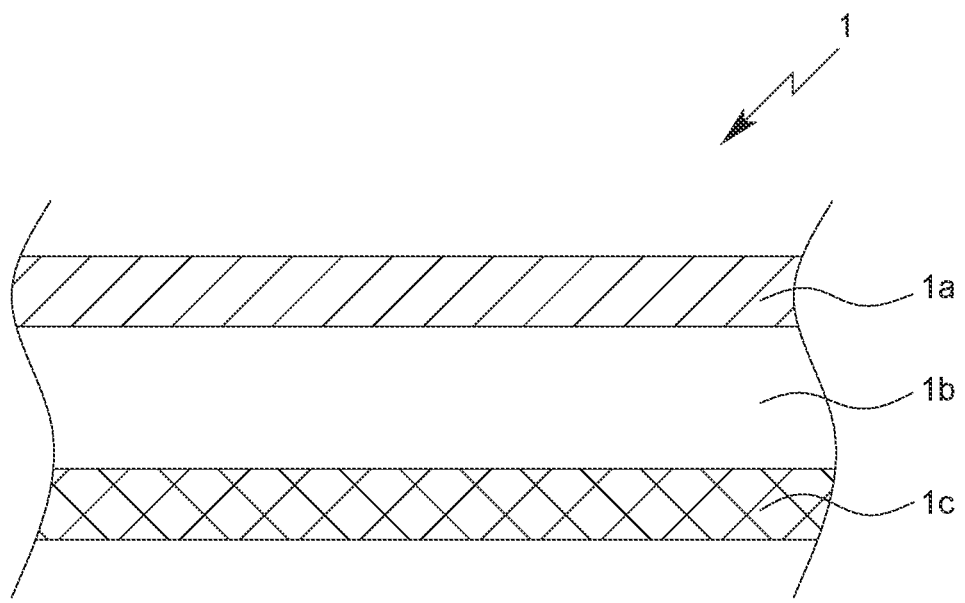

PACKAGING FILMS FROM RECYCLED PLASTICS

CROSS-REFERENCES TO RELATED APPLICATIONS

This application is a National Stage filing of International Application PCT/EP 2021/050062 filed Jan. 5, 2021, entitled "PACKAGING FILMS FROM RECYCLED PLASTICS" claiming priority to DE 10 2020 102 459.2 filed Jan. 31, 2020, DE 10 2020 103 009.6 filed Feb. 6, 2020, and DE 10 2020 103 362.1 filed Feb. 11, 2020. The subject application claims priority to DE 10 2020 102 459.2, DE 10 2020 103 009.6, DE 10 2020 103 362.1, and PCT/EP 2021/050062, and incorporates all by reference herein, in their entirety.

BACKGROUND OF THE INVENTION

The present invention relates to the field of waste recycling, in particular the recycling (recycling) of plastic waste, in particular for the production of plastic films, in particular packaging films, based on plastic recyclate (preferably plastic recyclate in the form of so-called post-consumer plastic recyclate, synonymously also referred to as PCR plastic recyclate, in particular plastic recyclate in the form of PCR recycled films).

In particular, the present invention relates to a multilayer plastic film, in particular a multilayer plastic composite film, preferably a multilayer plastic packaging film, based on recycled plastic (recycled plastic), in particular based on recycled plastic derived from waste (preferably recycled plastic in the form of so-called post-consumer recycled plastic, synonymously also referred to as PCR recycled plastic, in particular recycled plastic in the form of PCR recycled films).

Furthermore, the present invention relates to the use of a multilayer plastic film according to the present invention for the production of packaging material and/or as packaging material.

Finally, the present invention relates to a packaging material comprising at least one multilayer plastic film according to the present invention.

In Germany, approximately 2.5 million tons of packaging waste or plastic waste (plastic waste) are generated annually, with a large part of this being stored in landfills or thermally disposed of in waste incineration plants. For the manufacture of products based on plastics (synonymously also referred to as "plastics"), mainly newly produced plastics (so-called "virgin materials" or "primary plastics") are used from mostly fossil raw materials (such as crude oil, natural gas, coal, etc.); i.e. no plastic waste or recycled plastics are usually used to manufacture such plastic-based products, but mainly virgin or primary plastics produced from finite natural raw materials, such as petroleum, coal or natural gas, by chemical synthesis processes.

Old plastics cannot be converted back into their original materials by biological degradation processes or otherwise, so that the earth's raw material reserves are significantly reduced by the constant new production of plastics, which is why reuse or recycling (recycling) is becoming increasingly important in society. Also, the constantly increasing amount of waste, especially plastic-based waste, can no longer be easily stored or disposed of in any other way, so that recycling is also necessary due to the resulting environmental pollution.

The term "recycling" or "recycling processes" (synonymously also "recycling" or "recycling processes") refers in particular to those procedures or processes in which raw materials are recovered from waste, which in turn are fed back into the economic cycle, in particular are processed into new products; these processes are also referred to as material recovery. Such processes significantly reduce the quantities of waste generated, in particular the quantities of waste that would otherwise have to be incinerated or landfilled, while at the same time conserving the earth's finite reserves of raw materials. In this context, it should be noted that the term "recycling" refers to the (re)recovery of neurohazardous materials from actual waste, but not, for example, the reuse or further use of production residues. In particular, the plastic waste to be recycled may, for example, be films or packaging that has already been used by third parties and has been returned to the end customer.

In this context, the term recycling stands in particular for reuse or reprocessing and describes in particular a recovery process by which plastic-based waste (plastic waste) is reprocessed into products, materials or substances either for the original purpose or for other purposes (cf. also Section 3 (25) of the German Closed Substance Cycle Waste Management Act). The term thus also includes, in particular, the processing of organic materials, but not energy recovery and processing into materials intended for use as fuel or for backfilling.

In this context, the term recyclates refers in particular to secondary materials as a basis for the manufacture of (quality) new products, i.e. recycled plastics from plastic-based waste (plastic waste), especially from so-called post-consumer waste.

The term "reclaims", on the other hand, which is to be distinguished from "recyclates", refers in particular to quantities of material that originate from internal production waste and can be fed directly back into the manufacturing process, usually after suitable comminution. Such materials are therefore not to be subsumed under the term recyclates.

In particular, so-called post-consumer recycling (PCR) refers to the reprocessing of so-called post-consumer waste, i.e. plastic waste generated by consumers, especially in households, offices and the stationary trade.

The recycling of plastic waste has been facilitated in Germany in particular since 1990 by the introduction of separate waste collection (dual waste collection and recycling system or "Green Dot"), which means that pre-sorting by the consumer already takes place. This is because the waste or waste material must be as pure as possible in order to be reused in new production.

In the recycling process, waste that is still not sorted by type must be further sorted or separated despite initial pre-separation or pre-sorting by the consumer. In the case of plastic-based waste (plastic waste), for example, there is an indeterminate mixture of a large number of different types of plastic. In this context, a number of processes are known, some of them automated, which further sort the plastic waste either by color or by other physico-chemical properties (e.g. by means of laser or infrared technology, density determination, etc.) in order to increase the grade purity of the respective plastic grade as far as possible, since plastic grades which are incompatible with each other cannot be further processed into a new valuable material or product without further ado.

The objective of such a recycling process for plastic waste is to obtain plastic waste material that is as pure as possible in terms of type (i.e. pure in terms of plastic type), since only such plastic waste material that is pure in terms of plastic type can be processed into a highly valuable plastic recyclate for further processing into plastic products. For this purpose, the plastic waste is usually melted or sintered at, in particular as part of extrusion, injection molding, injection compression molding, sinter compression molding, intrusion processes, etc., which is why only plastics that are compatible with each other and of the same type can be processed in this way. The term grade purity (i.e. plastic grade purity) refers in particular to identical plastics or identical plastic grades with identical labeling (i.e. labeling according to DIN EN ISO 11469 and/or according to VDA standard 260). The (plastic) grade-specific identification and labeling carried out in the DIN EN ISO 11469 (2017) standard uses the code letters and abbreviations according to DIN EN ISO 1043 (2016) in each case for the designation of the respective plastic grade, the latter designating the plastic base polymers (e.g. PE for polyethylene, PP for polypropylene, PET for polyethylene terephthalate, etc.). Within a (single) type of plastic, further subdivisions or subclassifications may be made, but there is still only one type of plastic within the meaning of DIN EN ISO 11469 and/or VDA Standard 260 (e.g. subdivision or subclassification in the case of polyethylene, e.g. LDPE, LLDPE, HDPE, etc.); the same also applies to different molecular weights within a single type of plastic.

In this context, the plastic-based waste (plastic waste) pre-sorted by the consumer is further sorted, shredded and then, if necessary, further sorted and washed. Then the pre-sorted and cleaned waste, which is as pure as possible, is further processed into plastic recyclates, in particular in granulation, extrusion, injection molding, compression molding, sintering, intrusion processes, etc. Only the plastic recyclate obtained in this way can be used again in the production of new plastic products.

However, even in the case of unmixed plastic waste or recycled plastics, reuse, especially in the manufacture of new plastic products, is not always possible without further ado, since the impurities still contained therein (e.g. undesirable odorous substances, fats and oils, metals and heavy metals, foreign bodies such as wood, paper and cardboard, etc.) can impair the end product to be manufactured.

In addition, however, the reuse or recycling of unsorted plastics has also been considered: For example, the European patent specification EP 0 906 365 B1 describes a process that recycles unsorted plastic waste, whereby in this context a carrier material made of another material, such as wood, paper, cardboard, bulky waste, etc., is necessary and thus a multi-layered product made of different types of materials is formed overall. This is particularly problematic, since such mixed products of different kinds of materials cannot be recycled again, since a separation of the different kinds of materials cannot or at least not easily be carried out; such a process thus only allows a one-time recycling of unsorted plastic waste, whereby a renewed recycling, however, is no longer possible.

In this connection, comparable processes are also known which process unmixed plastic waste in combination with other foreign substances, in particular fillers or carrier substances (cf. e.g. DE 698 15 401 T2, EP 2 937 199 B1 and DE 37 15 646 A1), so that—as mentioned above—no renewed recycling is possible with regard to such mixed products from a large number of different materials.

Furthermore, the use or recycling of unmixed plastic waste for new production (i.e. for the production of new plastic-based products) is also known, although in this context significant amounts of virgin plastics usually have to be added to ensure the required qualities, as described for example in WO 92/15640 A1.

Consequently, the prior art still lacks possibilities to recycle plastic waste in such a way that high-performance plastic-based virgin materials can be provided or produced, which consist at least substantially or essentially exclusively of the respective plastic recyclates obtained from the plastic waste. Furthermore, the prior art also lacks the ability to provide such virgin plastics that consist substantially or essentially of plastic waste that can be recycled again so that a long-term and sustainable economic cycle is formed.

Therefore, in particular for economic, environmental and social reasons, it is not only desirable but rather necessary to use plastic waste for the new production of plastic-based products, whereby in this context—in order to enable a sustainable economic cycle—the end properties of the products manufactured using plastic waste should not deteriorate, at least in essence, compared to corresponding products manufactured from primary plastics.

BRIEF SUMMARY OF THE INVENTION

The problem underlying the present invention therefore consists in the provision of plastic films, in particular packaging films, based on recycled plastic, whereby the disadvantages of the prior art described above are to be at least largely avoided or at least mitigated.

In particular, such plastic films, especially packaging films, based on plastic recyclate are to be provided, which are at least substantially formed of or consist of materials recycled from plastic waste (i.e. plastic recyclate).

In particular, a further task underlying the present invention is the provision of plastic films, in particular packaging films, based on recycled plastics, which have at least substantially equivalent or at most slightly or insignificantly inferior properties (e.g. mechanical and/or optical and/or haptic etc. properties) to plastic films based on primary plastics.

Furthermore, a further task underlying the present invention consists in particular in the provision of such plastic films, in particular packaging films, based on plastic recyclate, which consist substantially of one (single or uniform) material, in particular of one (single or uniform) type of plastic. In particular, the plastic films should not represent products made of a plurality of different materials (e.g. different types of plastic).

In addition, a further task underlying the present invention is the provision of plastic films, in particular packaging films, based on plastic recyclate, which can be processed automatically or in automated filling and/or packaging systems (e.g. FFS or VFFS systems).

Finally, plastic films, in particular packaging films based on recycled plastic, are to be provided which are suitable for a renewed recycling process.

In a completely surprising way, the applicant has now discovered that, in order to solve the problem or task described above, it is possible to use in particular multilayer (multi-layer) plastic films, in particular plastic laminates. In particular, multilayer plastic films, in particular plastic composite films, preferably plastic packaging films, based on recycled plastic, in particular based on plastic recycled from waste, are suitable for solving the problem or task described above, which are formed from at least three interconnected film layers, in particular interconnected and/or coextruded by means of coextrusion, and have a plastic recyclate content of at least 80% by weight, based on the plastic film. % by weight, based on the plastic film.

To solve the problem described above, the present invention therefore proposes—according to a first aspect of the present invention—a multilayer plastic film, in particular multilayer plastic composite film, preferably multilayer plastic packaging film, based on plastic recyclate (recycled plastic), in particular based on plastic recyclate originating from waste. Further, in particular special and/or advantageous embodiments of the process according to the invention are similarly provided.

Furthermore, the present invention relates—according to a second aspect of the present invention—to the use of a multilayer plastic film according to the present invention for the production of packaging material and/or as packaging material. Further, in particular special and/or advantageous embodiments of this aspect of the invention are also provided.

Similarly, the present invention relates—according to a third aspect of the present invention—to a packaging material according to the present invention, comprising at least one multilayer plastic film according to the present invention.

It is self-evident from the following explanations that designs, embodiments, advantages and the like, which are set out below for the purpose of avoiding repetition in respect of only one aspect of the invention, naturally also apply accordingly in respect of the other aspects of the invention, without this requiring separate mention.

Furthermore, it goes without saying that individual aspects and embodiments of the present invention are also considered disclosed in any combination with other aspects and embodiments of the present invention and, in particular, any combination of features and embodiments as resulting from the back references of all patent claims is also considered extensively disclosed with respect to all resulting possible combinations.

In the case of all relative or percentage weight-related data mentioned below, in particular relative quantity or weight data, it should furthermore be noted that, within the scope of the present invention, these are to be selected by the person skilled in the art in such a way that they always add up to 100% or 100% by weight in total, taking into account all components or ingredients, in particular as defined below; however, this is self-evident to the person skilled in the art.

In all other respects, the person skilled in the art can deviate from the following range specifications, if necessary, without departing from the scope of the present invention, either in relation to the application or in individual cases.

In addition, it applies that all values or parameters or the like mentioned in the following can basically be determined with standardized or explicitly stated determination methods or otherwise with determination or measurement methods familiar to the expert in this field.

Having said this, the present invention will now be explained in detail below.

BRIEF DESCRIPTION OF THE DRAWINGS

FIG. 1 shows a multilayer plastic film or laminate 1 according to the invention, wherein the plastic film comprises a laminate of three interconnected film layers 1a, 1b, and 1c.

DETAILED DESCRIPTION OF THE INVENTION

Thus, an object of the present invention—according to a first aspect of the present invention—is a multilayer plastic film, in particular multilayer plastic composite film, preferably multilayer plastic packaging film, based on recycled plastic (recycled plastic), in particular based on recycled plastic derived from waste, wherein the plastic film comprises a laminate of at least three film layers bonded to one another, in particular bonded and/or coextruded by means of coextrusion, wherein the plastic film and/or layered composite comprises a first outer film layer and a second outer film layer, and a carrier film layer disposed between the first outer film layer and the second outer film layer, wherein the plastic film—has a plastic recyclate content of at least 80% by weight—, based on the plastic film.

As explained above, the applicant has found out completely surprisingly that a plastic film can be produced on the basis of plastic recyclate originating from waste with a plastic recyclate content of at least 80% by weight %, based on the plastic film, can be produced, which has at least essentially equivalent or at most slightly or insignificantly worse properties (e.g. mechanical or optical or haptic etc. properties) than plastic films based on primary plastics, provided that the plastic film is multilayered, in particular as a plastic composite film, preferably as a plastic packaging film, which is formed from at least three film layers bonded to one another, in particular bonded and/or coextruded by means of coextrusion.

In particular, the applicant has surprisingly found that under these conditions, high performance plastic films can be provided despite the very high recycled plastic content.

In particular, the plastic films according to the invention are formed or consist at least substantially of materials or plastic recyclate recycled from plastic waste. At the same time, it is possible to subject the plastic films according to the invention, in particular packaging films, based on plastic recyclate, which consist substantially of a single or uniform plastic material (i.e., at least substantially of a single or uniform type of plastic), to renewed recycling after their use or to introduce them into a renewed recycling process, in order ultimately to obtain new plastic recyclate therefrom again. In other words, the plastic films according to the invention are themselves recyclable or recyclable again (recyclable).

The term "recyclate" or "plastic recyclate", as used in accordance with the invention, refers in particular to those plastics which are provided by recycling, i.e. in particular separation according to type of plastic, cleaning and comminution, from plastic-based waste. In this context, in particular such wastes can be used as are, for example, already pre-sorted by the consumer in the household in the "Green Dot" system and are preferably disposed of in the yellow bag or the yellow garbage can. These materials are mostly subjected to a washing process (cf. also above and still following explanations).

In particular, in the context of the present invention, a plastic recyclate in the form of so-called post-consumer plastic recyclate, synonymously also referred to as PCR plastic recyclate, in particular plastic recyclate in the form of PCR recycled films, can be used as the plastic recyclate. The plastic film then obtained according to the invention is consequently a so-called PCR plastic film (post-consumer recycled plastic film).

The term of grade purity as used according to the invention refers to the plastic grade purity, i.e. according to the invention, the term of grade purity means in particular that at least substantially only one (single) plastic grade or only identical plastics/plastic grades are present. In this context, identical plastic grades are those plastics which have the same identification according to DIN EN ISO 11469 and/or VDA standard 260 (whereby in the standard DIN EN ISO 11469 (2017) the plastic grade specific identification and marking for the designation of the respective plastic grades is based on the identification letters or abbreviations according to DIN EN ISO 1043 (2016)). In DIN EN ISO 1043, the plastic base polymers are designated by code letters or abbreviations (e.g. PE for polyethylene, PP for polypropylene, PET for polyethylene terephthalate, etc.).); although in this context the plastic grades may be subject to further subdivision or subclassification (e.g. subdivision or subclassification according to density, crosslinking, molecular weight, etc.), they nevertheless correspond to a single plastic grade within the meaning of DIN EN ISO 11469 or VDA standard 260 and thus within the meaning of the present invention.

Due to the particularly high recycled content of the plastic films according to the invention of at least 80 wt. %, these plastic films are particularly resource-saving, since waste materials are used and in this way supplied to a new added value and consequently no or only very small quantities of new raw materials have to be obtained from fossil starting materials or raw materials (e.g. crude oil, coal, natural gas, etc.). Moreover, in this context there is a high energy efficiency with regard to the use of raw materials, in particular because the corresponding plastics do not have to be (newly) produced from the corresponding fossil starting materials/raw materials as so-called primary plastics, but rather already existing plastic materials are sorted or (separated) and purified according to their type of plastic, so that they can then be reused as plastic recyclate after further processing (e.g. comminution, processing into granulates, etc.). Overall, therefore, there is a high level of environmental compatibility with regard to the plastic films according to the invention, in particular a high level of compatibility with regard to environmental protection, in particular through resource or raw material savings or through resource and raw material management.

In a completely surprising way, the applicant has found out that the plastic films according to the present invention, despite a recycled content of at least 80% by weight, have at least similar or comparable performance properties compared to "new" plastic films (i.e. compared to plastic films made from primary plastics), namely above all similar or comparable mechanical properties, but in addition also similar or comparable further properties, such as, for example, optical properties, processing properties such as printability, sealability, etc., processability into packaging, tubes, bags, sacks, etc., etc., etc. processing capability into packaging, tubes, bags, sacks, etc., and processing capability in automated filling systems. processability in automated filling and/or packaging lines, in particular FFS or VFFS lines, etc.

Furthermore, the plastic films according to the invention based on plastic recyclate with a content of at least 80% by weight are at the same time at least substantially equal in price to "new" plastic films (i.e. plastic films which are produced using plastic primary materials).

Similarly, the plastic films according to the invention also help to reduce the quantities of plastic waste that are generated and would otherwise have to be disposed of, and to feed the plastic waste to an economically and ecologically efficient and compatible recycling or reuse.

In addition, the plastic films according to the invention not only have similar or comparable performance properties to primary plastic films, but can also be recycled again after use, thus enabling a closed-loop system. Such a closed-loop operation further increases the environmental compatibility of the plastic films according to the invention, in particular a long-lasting recycling or use of the underlying materials is possible without or only by minimal addition of new or primary plastics, so that fossil starting materials (i.e. the finite raw material reserves) can be sustainably protected or conserved.

In a completely surprising way, the applicant has found that the plastic film according to the invention based on at least 80% by weight of plastic recyclate, by being formed in the form of a layered composite or as a layered composite, has significantly improved properties compared to corresponding single-layer films (mono films), in particular with regard to application, adaptability and the mechanical properties.

In this context, the different layers of the multilayer plastic film according to the invention—although the individual layers are each based on the same type of recycled plastic—can be equipped with different properties (cf. the following explanations). Due to the different properties of the individual layers of the multilayer plastic film according to the invention, it is possible to adapt or tailor the overall properties of the multilayer plastic film (for example, the optical properties by coloring and/or homogenization over the film composite, or mechanical properties, the sealability or sealability, etc.), since the individual layers can be formed with different properties (e.g. with different thicknesses, different ingredients, such as additives, pigments, etc.) and the individual layers can thus each make a different contribution within the layer composite.

Furthermore, by forming the plastic films according to the invention in the form of a layer composite, it is possible for the two outer sides to be colored differently, which is advantageous depending on the desired application or use. It is also possible, for example, to equip the two outer sides with different surface properties, e.g. roughness (e.g. printability on one outer side, non-stick protection on the other outer side, etc.).

In this context, improved optical properties can be provided, particularly in the case of opaque films, since inhomogeneities, which can be caused, for example, by impurities remaining in the recycled plastic (e.g. foreign substances such as metal particles, wood particles, oils, plastic particles, etc.), can be evened out or leveled over the various layers. This equalization or leveling can be achieved, among other things, by using different color pigments in the individual or different layers. Furthermore, improved degrees of opacity can also be achieved, which may be particularly important or necessary for preventing the formation of algae and germs in the case of packaged organic materials, or an improved visual protection for packaged goods can be provided in this way.

In addition, the applicant has surprisingly found that the multilayer structure, in particular with different properties and/or different further ingredients or additives in the respective individual layers, enables improved suppression of undesired migration of the ingredients (e.g. of UV stabilizers) or of impurities.

Furthermore, it is also possible to equip only a certain layer with necessary additives, as for example in the case of tubular films, where only the inner side can be equipped with an anti-adhesive or anti-blocking agent, such as chalk, to efficiently prevent blocking or sticking together of the inner layers lying on top of each other.

Overall, by forming the plastic film according to the invention in the form of a layer composite with identical overall layer thickness, improved mechanical properties, in particular better stability, tensile strength, elongation at break, puncture resistance, etc., and/or improved optical properties and/or improved other properties can be achieved compared with corresponding monolayers (i.e. in particular monolayers based on plastic recyclate). In addition, the plastic film formed as a layer composite in accordance with the invention is more adaptable or tailorable with respect to the required or desired overall properties or application properties of the plastic film compared with corresponding mono films.

In addition, the present invention is characterized by other advantages as indicated below:

In particular, the high recyclate content, especially with high independent grade purity, of the plastic film according to the invention leads to particularly good independent recyclability.

The multilayer plastic film according to the invention can be processed universally, in particular the multilayer plastic film can be formed and used as a flat film and, if required, can be wound, for example, into rolls for transport and/or processing, for example in the packaging industry. In addition, however, the multilayer plastic film according to the invention can also be processed or formed into a semi-tubular film or tubular film, or in the form of bags, pouches, etc.

In addition, the multilayer plastic film according to the invention can also be used universally. In particular, the multilayer plastic film according to the invention is suitable as a packaging material in the non-food sector, in particular for industrial packaging of, for example, bulk goods, (planting) soil, fertilizers, mulch, humus, etc., detergents, adhesives, pellets and granulates, household goods and merchandise, or for hygiene applications. In this context, the multilayer plastic film according to the invention is suitable for processing in known and common industrial and automated filling and/or packaging equipment (e.g. FFS or VFFS equipment), so that no conversion is required for the use of the plastic films according to the invention.

In particular, the present invention makes it possible for the first time to provide plastic films, especially packaging films, based on plastic recyclate, which can be readily automated or processed in automated filling and/or packaging lines (e.g., in so-called FFS or VFFS lines [i.e., form-fill-seal lines or vertical form-fill-seal lines]).

Furthermore, as previously stated, the properties of the multilayer plastic film according to the invention are easily and efficiently adaptable or tailorable.

In particular, the multilayer plastic films according to the invention have very good film properties, especially good mechanical, optical, haptic and other properties.

In addition, the plastic films according to the invention are compatible with respect to other plastics, e.g. for bonding with other plastics.

The multilayer plastic film according to the invention can be further processed using conventional finishing processes, such as printing, coating, etc.

Overall, plastic films can thus be provided within the scope of the present invention, which are formed from plastic-based waste materials and thus again form a product that is of value to the economic cycle and thus sustainable while conserving resources, and which itself again exhibits a high degree of environmental compatibility, since it can be recycled or recyclable independently.

Preferred embodiments of the plastic film according to the invention are described and explained in more detail below:

As previously stated, the plastic film according to the present invention is a multilayer plastic film, in particular multilayer plastic composite film, preferably multilayer plastic packaging film, based on plastic recyclate (recycled plastic), in particular based on plastic recyclate derived from waste, wherein the plastic film comprises a layer composite of at least three interconnected film layers, and/or coextruded, the plastic film and/or the layer composite comprising a first outer film layer and a second outer film layer and a carrier film layer arranged between the first outer film layer and the second outer film layer, the plastic film having a plastic recyclate content of at least 80% by weight, based on the plastic film.-%, based on the plastic film.

According to a particular embodiment of the present invention, the plastic recyclate of the plastic film according to the invention has a (plastic) grade purity, in particular grade purity of the plastic grade according to DIN EN ISO 11469, of at least 90 wt. %, in particular at least 95 wt. %, based on the plastic recyclate.

With regard to the term "grade purity" or "plastic grade purity" mentioned above and below, it refers in particular to identical plastics or identical plastic grades with identical labeling (i.e. labeling according to DIN EN ISO 11469 and/or according to VDA standard 260). The (plastic) grade-specific identification and labeling carried out in the DIN EN ISO 11469 (2017) standard uses the code letters and abbreviations according to DIN EN ISO 1043 (2016) for the designation of the respective plastic grade, the latter designating the plastic base polymers (e.g. PE for polyethylene, PP for polypropylene, PET for polyethylene terephthalate, etc.). Within a (single) type of plastic, further subdivisions or subclassifications can be made, but there is still only one type of plastic within the meaning of DIN EN ISO 11469 and/or VDA Standard 260 (e.g. subdivision or subclassification in the case of polyethylene, e.g. LDPE, LLDPE, HDPE, etc.). Also, in the sense of DIN EN ISO 11469 and/or VDA standard 260, there is a (single) plastic grade with different molecular weights within a previously defined plastic grade.

According to a further particular embodiment of the present invention, the plastic recyclate of the plastic film according to the invention is at least substantially (plastic) grade-pure. In particular, the plastic recyclate has a (plastic) grade purity, in particular grade purity of the plastic grade according to DIN EN ISO 11469, of at least 90% by weight, in particular at least 95% by weight, based on the plastic recyclate.

According to the invention, it is preferred if the plastic recyclate of the plastic film according to the invention has at least essentially only one (single) plastic grade, in particular only one (single) plastic grade according to DIN EN ISO 11469. In particular, the plastic grade is present with a (grade) purity of at least 90% by weight, in particular at least 95% by weight, based on the plastic recyclate.

In addition, it is preferred according to the invention if the plastic recyclate of the plastic film according to the invention comprises at least substantially only single-grade plastic; in particular, the (plastic) grade purity, in particular the grade purity of the plastic grade according to DIN EN ISO 11469, can be at least 90% by weight, in particular at least 95% by weight, based on the plastic recyclate.

The use of single-grade plastic recyclate for the production of the plastic film according to the invention makes the plastic film suitable for recycling again and it can be reprocessed into new plastic recyclate and subsequently into new plastic-based products.

In this context, according to a further particular embodiment, it is provided that the plastic film according to the invention is also single-grade.

In particular, the plastic film according to the invention has a (plastic) grade purity, in particular grade purity of the plastic grade according to DIN EN ISO 11469, of at least 90 wt. %, in particular at least 95 wt. %, based on the plastic (content) of the plastic film.

Typically, the plastic film according to the invention is at least substantially (plastic) grade-pure. In particular, the plastic film has a (plastic) grade purity, especially grade purity of the plastic grade according to DIN EN ISO 11469, of at least 90% by weight, especially at least 95% by weight, based on the plastic (content) of the plastic film.

Preferably, the plastic film according to the invention has at least essentially only one (single) plastic grade, in particular only one (single) plastic grade according to DIN EN ISO 11469. In particular, the plastic grade has a (grade) purity of at least 90% by weight, especially at least 95% by weight, based on the plastic (content) of the plastic film.

In general, the plastic film according to the invention has at least essentially only single-grade plastic. In particular, the (plastic) grade purity, especially the grade purity of the plastic grade according to DIN EN ISO 11469, is at least 90% by weight, especially at least 95% by weight, based on the plastic (content) of the plastic film.

If the entire plastic film according to the invention consists at least substantially of single-grade plastic or comprises at least substantially only single-grade plastic, the plastic film according to the invention is suitable for recycling after its use, so that a sustainable economic cycle is formed, the quantities of waste produced and to be disposed of are reduced, and environmental protection and resource management of the earth are supported.

Furthermore, it can be provided within the scope of the present invention that the plastic film according to the invention comprises only plastic recyclate(s) of a (single) plastic grade, in particular plastic recyclate(s) of a (single) plastic grade according to DIN EN ISO 11469.

In this context, it is preferred if the plastic film according to the invention, in addition to the recycled plastic, comprises at least essentially only ingredients from the group consisting of fillers, colorants, color pigments, fragrances, antiblocking agents, lubricants, stabilizers, plasticizers and plasticizers, binders, primary plastics of the same plastic grade according to DIN EN ISO 11469 as the recycled plastic, auxiliaries and additives, and mixtures and combinations thereof.

In particular, according to a preferred embodiment of the present invention, it may be provided that the plastic film according to the invention does not comprise a different and/or further and/or additional plastic recyclate.

In this context, only plastic recyclate of one plastic grade as previously defined can be used within the scope of the present invention, whereby plastic recyclates from different batches can be used as long as it is a (single) plastic grade, in particular a (single) plastic grade according to DIN EN ISO 11469.

In particular, it is preferred according to the invention if the plastic film does not have a different and/or further and/or additional type of plastic, in particular a different and/or further and/or additional type of plastic according to DIN EN ISO 11469.

Overall, therefore, the aim is to provide a plastic film which consists at least essentially of one (single) type of plastic and is thus—for this reason, among others—particularly well suited for recycling.

According to the invention, it may be provided that the plastic film according to the invention has a (total) plastic content in the range from 80% by weight to 99.9% by weight, in particular in the range from 82.5% by weight to 99.8% by weight, preferably in the range from 85% by weight to 99.8% by weight, based on the plastic film.

In this context, the (total) plastic content refers both to the plastic recyclate and to any primary plastics of the same plastic grade according to DIN EN ISO 11469 as the plastic recyclate used. Overall, the plastic film according to the invention in this embodiment consists essentially of plastic, with only a small proportion of further substances, depending on the area of application and the corresponding requirements, being contained in the plastic film (whereby these further substances do not comprise any plastic which does not correspond to the same grade as the plastic recyclate).

Within the scope of the present invention, the plastic film according to the invention may in particular comprise ingredients selected from the group consisting of fillers, dyes, color pigments, fragrances, antiblocking agents, lubricants, stabilizers, plasticizers and plasticizers, binders, auxiliaries and additives as well as mixtures and combinations thereof, preferably in amounts in the range of 0.1 wt.-% to 20% by weight, in particular in the range from 0.2% to 17.5% by weight, preferably in the range from 0.2% to 15% by weight, based on the plastic film.

By adding such further ingredients—in addition to the recycled plastic and any primary plastic of the same type—the properties, in particular the mechanical, optical, haptic etc. properties, can be adapted or adjusted. properties can be adapted or adjusted. The plastic film can thus be tailored for its corresponding use or application.

According to a particular embodiment of the present invention, it may be provided that the plastic film is
plastic recyclate in amounts in the range from 80% to 97% by weight, particularly in amounts in the range from 82% to 96% by weight, preferably in amounts in the range from 84% to 95% by weight;
optionally, primary plastic(s) of the same plastic grade according to DIN EN ISO 11469 as the plastic recyclate, in particular in amounts in the range from 0.1% by weight to 15% by weight, preferably in amounts in the range from 0.5% by weight to 10% by weight, preferably in amounts in the range from 1% by weight to 9% by weight;
ingredients selected from the group consisting of fillers, colorants, color pigments, fragrances, antiblocking agents, lubricants, stabilizers, plasticizers and plasticizers, binders, auxiliaries and additives, and mixtures and combinations thereof, in amounts in the range from 0.1% by weight to 20% by weight, in particular in the range from 0.2% by weight to 17.5% by weight, preferably in the range from 0.2% by weight to 15% by weight;
wherein the above weight percentages are each based on the plastic film and are to be combined and/or selected so as to result in 100% by weight.

Plastic films containing these ingredients in the appropriate quantities are particularly suitable as packaging materials and are also suitable for subsequent recycling.

The layer thickness of the plastic film according to the invention can vary in wide ranges:

In particular, the plastic film according to the invention can have a layer thickness in the range from 10 μm to 300 μm, especially in the range from 15 μm to 200 μm, preferably in the range from 20 μm to 180 μm, particularly preferably in the range from 25 μm to 175 μm.

Furthermore, the plastic film according to the invention can have a layer thickness of at least 10 µm, in particular at least 15 µm, preferably at least 20 µm, particularly preferably at least 25 µm.

Furthermore, the plastic film according to the invention can have a layer thickness of up to 300 µm, in particular up to 200 µm, preferably up to 180 µm, particularly preferably up to 175 µm.

The layer thickness of the plastic film according to the invention can vary in wide ranges and is therefore particularly well adaptable to its corresponding application. In particular, the mechanical properties, such as tensile strength, elongation at break and dynamic puncture resistance, depend on the corresponding layer thickness. In addition, however, the processability and stability also change with the layer thickness. In particular, when using the plastic film of the invention as a packaging material, there may be different requirements (depending on the goods to be packaged or the goods to be packaged), so that the plastic film must be adapted according to its use.

According to a particular embodiment of the present invention, it may be provided that the layer thickness of the carrier film layer is 35% to 65%, in particular 40% to 60%, preferably 45% to 55%, particularly preferably about 50%, of the (total) layer thickness of the plastic film according to the invention.

Also, according to a particular embodiment of the present invention, it may be provided that the (summed) layer thicknesses of the outer film layers are 35% to 65%, in particular 40% to 60%, preferably 45% to 55%, particularly preferably about 50%, of the (total) layer thickness of the plastic film according to the invention.

The carrier film layer gives the multilayer plastic film according to the invention its stability, while the outer film layers of the multilayer plastic film according to the invention determine the optical properties, adhesion and friction, haptics and finishability, in particular printability and coatability. The specific combination of carrier film layer and the two outer film layers determines the impermeability and uniformity of the film as a whole. By adjusting the layer thickness proportions in the plastic film, the end properties, in particular optical properties, adhesion and friction, haptics, printability, impermeability, uniformity as well as stability can be tailored and adjusted according to the application.

In this context, it may be provided in particular that the ratio of the layer thicknesses of first outer film layer/carrier film layer/second outer film layer—varies in the range of 10-35: 40-60:10-35, in particular in the range of 15-30: 45-55:15-30.

According to a particular embodiment of the present invention, it may be provided that the individual film layers of the plastic film according to the invention each have a plastic recyclate content of at least 80% by weight, based on the respective film layer.

Thus, not only the plastic film as a whole or overall should have a plastic recyclate content of at least 80% by weight, but also each of the individual plastic layers. Thus, both the film layers forming the plastic film and the entire plastic film are based at least essentially (i.e. at least 80% or 80% by weight) on plastic recyclate. It is therefore not necessary to integrate one or more layers of primary plastic into the plastic film according to the invention in order to achieve substantially equivalent or comparable properties (e.g. mechanical and/or optical and/or haptic etc. properties) as in the case of plastic films based on primary plastics.

Furthermore, it is advantageous if the individual film layers of the plastic film according to the invention each have a plastic recyclate that is the same and/or of the same type with respect to the plastic forming the plastic recyclate, in particular with respect to the type of plastic forming the plastic recyclate according to DIN EN ISO 11469.

In this context, it is equally advantageous if the individual film layers of the plastic film according to the invention each have an identical and/or similar plastic grade with respect to the plastic forming the plastic recyclate, in particular according to DIN EN ISO 11469.

The individual film layers of the plastic film according to the invention are thus particularly pure and therefore also suitable for recycling.

Furthermore, it is also advantageous in this respect if the individual film layers of the plastic film according to the invention each have a (plastic) grade purity, in particular grade purity of the plastic grade according to DIN EN ISO 11469, of at least 90% by weight, in particular at least 95% by weight, based on the plastic (content) of the respective film layer.

Furthermore, it is also advantageous if the individual film layers of the plastic film according to the invention are each at least essentially (plastic material-)grade-pure. In particular, the film layers can each have a (plastic) grade purity, in particular grade purity of the plastic grade according to DIN EN ISO 11469, of at least 90% by weight, in particular at least 95% by weight, based on the plastic (content) of the respective film layer.

At the same time, it is also advantageous if the individual film layers of the plastic film according to the invention each have at least essentially only one (single) type of plastic, in particular only one (single) type of plastic according to DIN EN ISO 11469. In particular, the plastic grade is present in each case with a (grade) purity of at least 90% by weight, in particular at least 95% by weight, based on the plastic (content) of the respective film layer.

Furthermore, it is preferred if the individual film layers of the plastic film according to the invention each comprise at least substantially only single-grade plastic. In particular, the (plastic) grade purity, especially the grade purity of the plastic grade according to DIN EN ISO 11469, can be at least 90% by weight, especially at least 95% by weight, based on the plastic (proportion) of the respective film layer.

According to another particular embodiment of the present invention, the individual film layers of the plastic film according to the invention may each comprise a plastic recyclate based on polyethylene (PE recyclate), wherein the film layers each have a plastic recyclate content of at least 80% by weight, based on the respective film layer.

Furthermore, according to a particular embodiment, it may be provided that the polyethylene-based plastic recyclate (PE recyclate) has a (polyethylene) grade purity of at least 90% by weight, in particular at least 95% by weight, based on the polyethylene-based plastic recyclate.

In particular, the use of polyethylene as a plastic or the use of polyethylene-based plastic recyclate is advantageous because waste products based on polyethylene are available in large quantities and polyethylene is very suitable for recycling. In addition, polyethylene is easy to process and suitable for a wide range of applications.

Furthermore, according to a further particular embodiment, it may be provided that the individual film layers of the plastic film according to the invention additionally comprise primary polyethylene (polyethylene as and/or in the form of primary plastic), in particular in amounts in the range from 0.1% by weight to 15% by weight, in particular in amounts in the range from 0.5% by weight to 10% by weight, preferably in amounts in the range from 1% by weight to 9% by weight, based on the respective film layer.

The end properties of the plastic film according to the invention can be adjusted by the targeted addition of small amounts of primary polyethylene. In particular, specific polyethylene types, such as polyethylene with a specific molecular weight (e.g. UMHWPE, VLDPE, etc.) and/or polyethylene with a specific density (i.e. e.g. HDPE, MDPE, LDPE, LLDPE, etc.), can be added in this context in a targeted manner and depending on the desired end properties.

The individual film layers of the plastic film according to the invention are basically independent of one another in terms of their production or composition and thus their properties, although it is advantageous—as explained above—if all the film layers in each case consist at least essentially of the same type of plastic, preferably polyethylene, and are based at least essentially on recycled plastic and optionally contain at most only small amounts of primary plastic and/or other ingredients.

In this regard, at least two of the film layers of the plastic film according to the invention may each have different properties.

In particular, at least two of the film layers of the plastic film according to the invention can each have different layer thicknesses.

Furthermore, at least two of the film layers of the plastic film according to the invention can each have different optical properties, in particular different opacities and/or different colorations.

In addition, at least two of the film layers of the plastic film according to the invention may each have different ingredients, in particular the previously defined ingredients.

Furthermore, at least two of the film layers of the plastic film according to the invention can each have different mechanical properties, in particular different tensile strengths in the longitudinal and/or transverse direction and/or different elongations at break in the longitudinal and/or transverse direction and/or different dynamic puncture strengths and/or different coefficients of friction.

The properties of the (overall) plastic film can be adjusted by the different properties of the individual film layers (in particular, for example, by different layer thicknesses, different opacities or colorings, different ingredients and/or different mechanical properties, etc.), so that the film can be tailored to suit its application. In this context, for example, the two outer sides can thus have different haptic and/or optical properties.

In the context of the present invention, the multilayer plastic film should have a number of mechanical properties, in particular to make it suitable for use as a packaging film or to meet the requirements for use as a packaging film.

Typically, the plastic film according to the invention has a tensile strength in the longitudinal direction of at least 10 N/mm$^2$, in particular at least 15 N/mm$^2$, preferably at least 19 N/mm$^2$, in particular determined according to DIN EN ISO 527.

Advantageously, the plastic film according to the invention has a tensile strength in the transverse direction of at least 10 N/mm$^2$, in particular at least 12 N/mm$^2$, preferably at least 17 N/mm$^2$, in particular determined according to DIN EN ISO 527.

Tensile strength measures the maximum mechanical tension that the plastic film can withstand before breaking and is expressed as force per area. Tensile strength is a so-called intensive quantity or property, i.e. a state quantity which does not change with different sizes of the system under consideration, but this state quantity depends on the material, for example the manufacture of the specimen.

Preferably, the plastic film according to the invention has an elongation at break in the longitudinal direction of at least 150%, in particular at least 175%, preferably at least 200%, in particular determined according to DIN EN ISO 527.

In particular, the plastic film according to the invention has an elongation at break in the transverse direction of at least 180%, in particular at least 225%, preferably at least 250%, in particular determined according to DIN EN ISO 527.

The elongation at break, also known as tensile strain at break, indicates the remaining elongation of the tensile specimen after breakage in relation to the initial length, i.e. this determines the deformability or ductility of the plastic film. In other words, the elongation at break indicates the percentage ratio of the change in length at break to the initial length of the material and thus corresponds to the ability of a material to follow changes in shape or crack formation.

Preferably, the plastic film according to the invention further has a dynamic puncture resistance of at least 1.2 g/μm, in particular at least 1.5 g/μm, preferably at least 1.7 g/μm, in particular determined according to ASTM D 1709-98 (Dart drop test).

The dynamic puncture resistance, synonymously also referred to as impact resistance, evaluates the impact strength or toughness of a plastic film. The dynamic puncture resistance is measured in particular by means of the so-called dart drop test, in which the plastic film is first clamped tightly and without wrinkles and then a drop hammer of variable weight is dropped onto the film from a defined height. The weight of the drop hammer is determined at which the film is punctured in 50% of the drop tests.

The surface tension of the plastic film according to the invention (usually specified in the unit "dyn/cm" and in particular determined according to DIN 53364) can also be adapted or tailored. Surface tension, also known synonymously as surface energy, refers to the free energy of surfaces and is usually measured as the relative energy value of the interface of the plastic film to a liquid and is not only a material property, but also characterizes the property of the corresponding system, i.e. surface tension is a system property. When measuring surface tension according to DIN 53364, standardized test liquids with gradually increasing surface tension are applied to the plastic film surface. The surface energy of the plastic film is approximately equal to the surface tension of the test liquid when the applied liquid film wets the surface for 2 seconds, i.e. remains on the surface as a liquid film.

The friction behavior, in particular the coefficient of friction, of the plastic film according to the invention can also be adapted or tailored.

Typically, the (untreated) plastic film according to the invention has a coefficient of friction (also known as "coefficient of friction" or "COF") on metal of at most 0.45, determined in particular according to DIN 53375.

In particular, the treated plastic film according to the invention, especially the film treated by means of plasma or corona, has a coefficient of friction on metal of at most 0.55, in particular determined according to DIN 53375.

The coefficient of friction, synonymously also referred to as the coefficient of friction (or else as the so-called "coefficient of friction" or "COF"), is the dimensionless measure of the frictional force in relation to a contact force between two bodies. The coefficient of friction is determined in accordance with DIN 53375 by pulling a test weight covered with the plastic film over a surface, in this case: metal, measuring the force at which the test weight starts to move (static friction), and also measuring the force required to keep the test weight moving (sliding friction).

In particular, the surface of the plastic film according to the invention can be modified or provided with further (film) layers (e.g. lacquering, high-gloss effects, printing, etc.) in further working steps. In the context of the present invention, for example, a sealant can be applied to protect the surface (for example, to make the surface impermeable to water).

Typically, the plastic film according to the invention is designed to be sealable (sealable).

In particular, the plastic film according to the invention is designed to be equally refinable. In the context of the present invention, the term "finishing" includes in particular all processes which change or improve the surface properties.

Preferably, the plastic film is designed to be coatable in particular. Within the scope of the present invention, coatings of any kind are possible, which can be applied to the surface of the plastic film.

Advantageously, the plastic film is designed to be printable, in particular printable on at least one of its outer film layers. In the context of the present invention, the plastic film can be printed, for example, in order to apply a label, description, drawing, etc.

Preferably, the plastic film is formed rough and/or roughened, in particular on at least one of its outer film layers rough and/or roughened, in particular by means of plasma or corona treatment.

Corona treatment is an electrochemical process for surface modification of plastics, in which the plastic film is subjected to a high-voltage electrical discharge, which increases the surface tension.

This process is carried out between a grounded, polished roll of steel or aluminum and a close-fitting insulated electrode, although insulated rolls and uninsulated electrodes can also be used. The plastic film rests on the polished roll so that only the side facing the electrode is treated, with the back side also being treated if there is an air gap between the roll and the plastic film. As an alternative to corona treatment, a plasma process or plasma treatment of the surface can also be used.

Furthermore, it may be provided in the context of the present invention that the plastic film is printed, in particular printed on one of its outer film layers, preferably printed on a side of the relevant film layer facing away from the carrier film layer.

By printing the plastic film according to the invention on its outer side, the corresponding print is recognizable to the user or consumer when the plastic film is used and can be used in particular for labeling the packaging.

Furthermore, it may also be provided in the context of the present invention that the plastic film is provided and/or equipped with an identification means, preferably a marking, in particular an optically and/or electronically detectable identification means, in particular on one of its outer film layers, preferably on a side of the relevant film layer facing away from the carrier film layer.

The application of an identification means, which can be in the form of writing, a seal, a logo, a sign, a code, a barcode, a numerical code, a seal, etc., enables rapid and unambiguous identification of the plastic film itself or also of the goods packaged in the plastic film. In this context, the identification means may contain, for example, information regarding the origin, recyclability, (product) adhesion, ingredients, quality controls performed, minimum shelf life, etc.

According to a particular embodiment of the present invention, the plastic film according to the invention may be in the form of a flat film, tubular film or semi-tubular film.

According to a further particular embodiment, the plastic film according to the invention may be designed for use as packaging, in particular in the form of outer packaging, tubes, bags or sachets.

According to yet another particular embodiment, the plastic film according to the invention can be designed for packaging bulk goods, in particular selected from the group of (planting) soils, fertilizers, mulch, humus, detergents, adhesives, pellets, granulates, household goods and household products, or else for hygiene applications.

Furthermore, according to a particular embodiment, the plastic film according to the invention can be designed for use in the non-food sector, in particular as a packaging material.

According to a particular embodiment of the present invention, it may be provided that the plastic film according to the invention, in particular the layer composite of the plastic film, has further (film) layers. The further (film) layers may in particular be selected from the group of additional and/or further film layers, adhesion imparting layers, adhesive layers, cover layers, color layers, lacquers and combinations thereof.

By applying further (film) layers, in particular further of the previously mentioned layers, the properties of the plastic film according to the invention can be further adjusted and tailored according to the application requirements.

In particular, in this context, the further (film) layers are each formed from no other and/or further plastic recyclate, in particular from no other and/or further plastic grade according to DIN EN ISO 11469, with respect to the film layers of the plastic film according to the invention.

Furthermore, it is preferred if the further (film) layers each have a plastic recyclate that is the same and/or similar in relation to the plastic forming the plastic recyclate, in particular in relation to the type of plastic forming the plastic recyclate according to DIN EN ISO 11469.

In addition, it is further preferred if the further (film) layers each have an identical and/or similar plastic grade with respect to the plastic forming the plastic recyclate, in particular according to DIN EN ISO 11469.

Since the possible further (film) layers also have the same type of plastic as the plastic recyclate used, the plastic film according to the invention can still be recycled in this particular embodiment.

In the context of the present invention, it is preferred if the plastic film according to the invention is designed to be recyclable (recyclable) and/or recyclable.

Furthermore, it is also preferred in the context of the present invention if the plastic film according to the invention can be used after its use in the form of its plastic recyclate for the production of plastic-based products.

In particular, this means that the plastic film based on recycled plastic can be reprocessed into recycled plastic after use and then into a new plastic-based product. This creates a sustainable and long-lasting recyclable material and economic cycle.

According to a particular embodiment, it may be provided that the plastic film according to the invention is opaque, in particular opaque with respect to the wavelength range of visible light.

The term opacity generally refers to the opposite of transparency, i.e. lack of transparency or lack of permeability. The term is used particularly in optics and with reference to materials. Thus, opacity is a measure of the opacity (haze) of translucent (scattering light-transmitting) materials and coatings. Clear materials (with low scattering), on the other hand, are transparent; their light (in)transmission is expressed as optical density (logarithmic) or transmittance (linear). Opacity is the reciprocal of transmission.

The opacity thus describes the degree of opacity in percent. In particular, the opacity of a completely opaque plastic film is 100% and a completely transparent plastic film has an opacity of 0%.

In this context, the term "opaque" is understood to mean in particular the lack of transparency or opacity, especially opacity to light. In particular, opaque plastic films are just non-transparent in the wavelength range of visible light. The wavelength range of visible light refers in particular to electromagnetic radiation in the wavelength range from 380 nm to 780 nm.

One advantage of an opaque plastic film, especially when used as or for packaging films, is the fact that, for example, the goods contained therein are not recognizable or visible. Furthermore, the goods can be protected from UV radiation, which for example protects organic materials from germination, algae formation or mold growth.

In particular, it may be provided in this context that the plastic film according to the invention is opaque, in particular opaque with respect to the wavelength range of visible light, the opaque plastic film having an opacity of at least 80%, in particular of at least 90%, preferably of at least 95%, particularly preferably of at least 96%, in particular determined in accordance with DIN 53146.

According to this particular embodiment of the present invention, it may be provided that the opaque plastic film be colored.

In this context, "colored" means all available and/or possible colors, especially in the wavelength range of electromagnetic radiation from 380 nm to 780 nm, including the colors "white", "black" and "gray".

In particular, the opaque plastic film according to the invention can have coloring ingredients, in particular selected from color pigments, dyes, colorants and combinations thereof.

Furthermore, according to this particular embodiment of the present invention, it may be provided that the opaque and/or colored plastic film according to the invention has at least two mutually different colors and/or at least two mutually different coloring ingredients.

Furthermore, according to this particular embodiment of the present invention, it may be provided that at least two film layers of the opaque and/or colored plastic film according to the invention have different colors from each other and/or different coloring ingredients from each other.

Also, according to this particular embodiment of the present invention, it may be provided that the first outer film layer and the second outer film layer of the opaque and/or colored plastic film according to the invention have different colors from each other and/or different coloring ingredients from each other.

The different colors of the outer film layers can, for example, simultaneously provide visual protection, in particular by means of a dark color (e.g. black) or an opaque color (e.g. silver) of one outer film layer, and a colored design of the packaging film, in particular by using a further color different from black or silver.

Furthermore, according to this particular embodiment of the present invention, it may be provided that the first outer film layer and the carrier film layer of the opaque and/or colored plastic film according to the invention are each formed white and/or that the first outer film layer and the carrier film layer of the opaque and/or colored plastic film according to the invention each contain a white pigment, in particular an inorganic white pigment, preferably selected from the group consisting of titanium dioxide, lithophones, barium sulfate, zinc oxide, zinc sulfide, lead carbonate, aluminum oxide, silicon dioxide, calcium carbonate, lead white, cristobaltine, kaolin, Kremser white, marien glass, calcium aluminate sulfate, clay, antimony white and combinations thereof.

Furthermore, according to this particular embodiment of the present invention, it can be provided that the second outer film layer of the opaque and/or colored plastic film according to the invention is metal-colored, in particular silver-colored, or else black, preferably silver-colored, and/or that the second outer film layer of the opaque and/or colored plastic film according to the invention has a metal effect pigment, in particular a silver color pigment, or else a black pigment, preferably an inorganic metal effect pigment, in particular an inorganic silver color pigment, or else an inorganic black pigment, particularly preferably a metal effect pigment.

In this context, the black pigment may be selected in particular from the group of aniline black, leg black, graphite, charcoal, core black, copper dichromate, iron oxide black, vine black, carbon black, spinel black, manganese black, slate black, Frankfurt black, and combinations thereof.

Furthermore, the silver color pigment can in particular be a metal effect pigment. Metal effect pigments are, in particular, plate-shaped metallic pigments by means of which a directional reflection occurs when they are aligned parallel to the surface. Preferred are platelets based on aluminum and brass.

Also, according to this particular embodiment of the present invention, it may be provided that the opaque and/or colored plastic film has a first outer film layer comprising white and/or a white pigment, a carrier film layer comprising white and/or a white pigment, and a second outer film layer comprising a metal color and/or a metal effect pigment or else a black and/or a black pigment.

In particular, the design of the opaque and/or colored plastic film with a black or silver-colored first outer side and a white second outer side is preferred, since packaging films on this basis are at least substantially opaque and at least substantially UV-impermeable or at least UV-light-reducing, but at the same time have a light-colored outer side which can be marked or provided in particular by individual printing.

According to this aspect of the present invention (i.e., in the case of an opaque and/or colored plastic film according to the invention), a particular object of the present invention is a multilayer plastic film, in particular multilayer plastic composite film, preferably multilayer plastic packaging film, based on recycled plastic (recycled plastic), in particular based on recycled plastic derived from waste, in particular a multilayer plastic film as previously defined, wherein the plastic film comprises a laminate of at least three film layers bonded to one another, in particular bonded and/or coextruded by means of coextrusion, wherein the plastic film and/or layered composite comprises a first outer film layer and a second outer film layer, and a carrier film layer disposed between the first outer film layer and the second outer film layer, wherein the plastic film has a plastic recyclate content of at least 80% by weight—, based on the plastic film, wherein the plastic film has a layer thickness in the range of 10 μm to 300 μm, wherein the ratio of the layer thicknesses of first outer film layer/carrier film layer/second outer film layer—varies in the range of 10-35: 40-60:10-35, in particular in the range of 15-30: 45-55:15-30;

wherein plastic film is opaque, in particular opaque with respect to the wavelength range of visible light, in particular wherein the opaque plastic film has an opacity of at least 80%, in particular of at least 90%, preferably of at least 95%, particularly preferably of at least 96%, in particular determined according to DIN 53146;

wherein at least two film layers of the opaque and/or colored plastic film have different colors from one another and/or different coloring ingredients from one another.

In this context, it may be provided in particular that the first outer film layer and the carrier film layer are each formed white and/or that the first outer film layer and the carrier film layer each comprise a white pigment.

Furthermore, it can be provided in this context that the second outer film layer is metal-colored, in particular silver-colored, or else black, preferably silver-colored, and/or if the second outer film layer has a metal effect pigment, in particular silver color pigment, or else a black pigment, preferably an inorganic metal effect pigment, in particular inorganic silver color pigment, or else an inorganic black pigment, particularly preferably a metal effect pigment.

Furthermore, according to this aspect of the present invention (i.e., in the case of an opaque and/or colored plastic film according to the present invention), it is more particularly an object of the present invention to provide a multilayer plastic film, more particularly a multilayer plastic composite film, preferably a multilayer plastic packaging film, based on recycled plastic (recycled plastic), more particularly based on recycled plastic derived from waste, more particularly a multilayer plastic film as previously defined, wherein the plastic film comprises a laminate of at least three film layers bonded to one another, in particular bonded and/or coextruded by means of coextrusion, wherein the plastic film and/or layered composite comprises a first outer film layer and a second outer film layer, and a carrier film layer disposed between the first outer film layer and the second outer film layer, wherein the plastic film has a plastic recyclate content of at least 80% by weight, based on the plastic film, wherein the plastic film has a layer thickness in the range of 10 μm to 300 μm, wherein the ratio of the layer thicknesses of first outer film layer/carrier film layer/second outer film layer—varies in the range of 10-35: 40-60:10-35, in particular in the range of 15-30: 45-55:15-30;

wherein plastic film is opaque, in particular opaque with respect to the wavelength range of visible light, in particular wherein the opaque plastic film has an opacity of at least 80%, in particular of at least 90%, preferably of at least 95%, particularly preferably of at least 96%, in particular determined according to DIN 53146;

wherein at least two film layers of the opaque and/or colored plastic film have mutually different colors and/or mutually different coloring ingredients; wherein the first outer film layer and the carrier film layer are each white and/or wherein the first outer film layer and the carrier film layer each comprise a white pigment and wherein the second outer film layer is metallic-colored, in particular silver-colored, or black, preferably silver-colored, and/or wherein the second outer film layer comprises a metal effect pigment, in particular silver color pigment, or else a black pigment, preferably an inorganic metal effect pigment, in particular inorganic silver color pigment, or else an inorganic black pigment, particularly preferably a metal effect pigment.

In particular, the opaque or colored plastic film or the corresponding opaque or colored film layers of the plastic film according to the invention can have a stabilizer, in particular a UV stabilizer.

Typically, the opaque and/or colored plastic film contains at least one stabilizer, in particular a UV stabilizer, preferably in amounts in the range of 0.01 to 5% by weight, preferably 0.1 to 3% by weight, based on the plastic film.

Preferably, the film layers of the opaque and/or colored plastic film each contain at least one stabilizer, in particular a UV stabilizer, preferably in amounts in the range from 0.01 to 5% by weight, preferably 0.1 to 3% by weight, based on the respective film layer.

According to an alternative particular embodiment, it may be provided that the plastic film is transparent, in particular transparent with respect to the wavelength range of visible light.

In this context, "transparent" refers to translucency or transmittance; in particular, transparent plastic films are transparent with respect to the wavelength range of visible light. The wavelength range of visible light refers in particular to electromagnetic radiation in the wavelength range from 380 nm to 780 nm.

In physics, transparency refers in particular to the ability of matter to allow electromagnetic waves to pass through (transmission). In general, the term is usually used to refer to visible light, i.e. to the spectral range of electromagnetic radiation that is visible to humans. Transparency is therefore an optical property of a material; other optical properties are, for example, reflectivity and absorptivity.

A significant advantage of a transparent plastic film according to the invention, especially when used as or for packaging films, is the fact that, for example, the goods contained therein are recognizable or visible, which can be used for quality control, for example.

As previously stated, according to this alternative particular embodiment, the plastic film according to the invention can be formed transparent, in particular transparent with respect to the wavelength range of visible light. In particular, it may be provided in this context that the plastic film formed transparently has a transparency of at least 70%, in particular of at least 75%, preferably of at least 80%, particularly preferably of at least 85%, very particularly preferably of at least 90%, even more preferably of at least 95%, in particular determined in accordance with DIN EN ISO 13468.

Transparency in this context is the measure of light transmission in percent. In particular, the transparency of a completely translucent plastic film is 100%, and a completely opaque plastic film has a transparency of 0% (i.e. 100% opacity).

Also, according to this particular embodiment of the present invention, it may be provided that the transparent plastic film according to the invention has an opacity of not more than 30%, in particular of not more than 25%, preferably of not more than 20%, more preferably of not more than 15%, most preferably of not more than 10%, even more preferably of not more than 5%, in particular determined according to DIN 53146.

Furthermore, it can also be provided that the transparent plastic film has a haze value of at most 30%, in particular at most 25%, preferably at most 20%, particularly preferably at most 15%, very particularly preferably at most 10%, even more preferably at most 5%, in particular determined according to ASTM D-1003.

In this context, the haze value is in particular a measure of the haze of transparent samples or plastic films and describes the proportion of transmitted light that is scattered forward by the sample or plastic film; i.e., the haze value quantifies material defects in the surface or structure that interfere with clear visibility.

According to this particular embodiment of the present invention, it may furthermore be provided that the transparent plastic film according to the invention contains primary plastic(s) of the same plastic grade according to DIN EN ISO 11469 as the plastic recyclate, in particular in amounts in the range from 0.1% by weight to 15% by weight, preferably in amounts in the range from 0.5% by weight to 10% by weight, preferably in amounts in the range from 1% by weight to 9% by weight, based on the plastic film.

Furthermore, it can also be provided that at least one of the film layers, in particular at least two of the film layers, preferably all film layers, of the transparent plastic film according to the invention contains primary plastic(s) of the same plastic grade according to DIN EN ISO 11469 as the plastic recyclate, in particular in quantities in the range from 0.1% by weight to 15% by weight, preferably in amounts in the range from 0.5% by weight to 10% by weight, preferably in amounts in the range from 1% by weight to 9% by weight, based on the respective film layer.

By adding small amounts of primary plastic, the transparency of the plastic film can be increased or improved. In particular, any impurities still present in the recycled plastic can be leveled or evened out. In addition, the properties, in particular the optical, haptic and mechanical properties, can be influenced, in particular adapted or tailored, by the targeted selection of the added primary plastic.

Typically, the first outer film layer or the second outer film layer of the transparently formed plastic film according to the invention has at least one non-stick agent (anti-blocking agent) or the transparently formed plastic film according to the invention has at least one non-stick agent (anti-blocking agent), in particular in and/or on one of the outer film layers.

In this context, the anti-adhesion agent (anti-blocking agent) may be-present in amounts in the range from 0.5% by weight to 10% by weight, in particular in the range from 1% by weight to 9% by weight, preferably in the range from 2% by weight to 8% by weight, particularly preferably in the range from 3% by weight to 7% by weight, based on the respective outer film layer.

In addition, it may also be provided that the anti-adhesion agent (anti-blocking agent) is present in amounts in the range from 0.1% by weight to 6% by weight, in particular in the range from 0.2% by weight to 5% by weight, preferably in the range from 0.3% by weight to 4% by weight, particularly preferably in the range from 0.5% by weight to 3% by weight, based on the plastic film.

In this context, the at least one anti-adhesive agent may in particular (anti-blocking agent) be selected from chalk.

The addition of an anti-adhesive or anti-blocking agent, especially in the form of chalk, is particularly advantageous in the case of transparent plastic films, which are designed as tubular or semi-tubular films. Transparent plastic films have a very smooth and uniform surface, so that in the case of tubular and semi-tubular films the inner surfaces can adhere to each other or cannot be easily separated again (which is generally not the case with opaque, in particular colored, plastic films, since, for example, the colored pigments result in a relatively rougher surface). By adding small amounts of non-stick agent, which does not significantly affect transparency, this effect can be effectively prevented, especially in the case of transparent films. The added non-stick agent has no influence on the recyclability of the plastic film.

According to this aspect of the present invention (i.e., in the case of a transparently formed plastic film according to the present invention), a particular object of the present invention is a multilayer plastic film, in particular multilayer plastic composite film, preferably multilayer plastic packaging film, based on recycled plastic (recycled plastic), in particular based on recycled plastic derived from waste, in particular multilayer plastic film as previously defined, preferably a transparent multilayer plastic film as previously defined, wherein the plastic film comprises a laminate of at least three film layers bonded to one another, in particular bonded and/or coextruded by means of coextrusion, wherein the plastic film and/or layered composite comprises a first outer film layer and a second outer film layer, and a carrier film layer disposed between the first outer film layer and the second outer film layer, wherein the plastic film has a plastic recyclate content of at least 80% by weight—, based on the plastic film, wherein the plastic film has a layer thickness in the range of 10 μm to 300 μm, wherein the ratio of the layer thicknesses of first outer film layer/carrier film layer/second outer film layer varies in the range of 10-35: 40-60:10-35, in particular in the range of 15-30: 45-55:15-30;

wherein plastic film is transparent, in particular transparent with respect to the wavelength range of visible light, in particular wherein the transparent plastic film has a transparency of at least 70%, in particular of at least 75%, preferably of at least 80%, particularly preferably of at least 85%, very particularly preferably of at least 90%, even more preferably of at least 95%, in particular determined in accordance with DIN EN ISO 13468, and/or in particular where the transparent plastic film has an opacity of at most 30%, in particular at most 25%, preferably at most 20%, particularly preferably at most 15%, very particularly preferably at most 10%, even more preferably at most 5%, in particular determined in accordance with DIN 53146.

Furthermore, according to this embodiment (i.e., in the case of a transparently formed plastic film according to the invention), in particular also an object of the present invention according to this aspect of the invention is a multilayer plastic film, in particular multilayer plastic composite film, preferably multilayer plastic packaging film, based on recycled plastic (recycled plastic), in particular based on recycled plastic derived from waste, in particular multilayer plastic film as previously defined, preferably a transparent multilayer plastic film as previously defined, wherein the plastic film comprises a laminate of at least three film layers bonded to one another, in particular bonded and/or coextruded by means of coextrusion, wherein the plastic film and/or layered composite comprises a first outer film layer and a second outer film layer, and a carrier film layer disposed between the first outer film layer and the second outer film layer, wherein the plastic film—has a plastic recyclate content of at least 80% by weight—, based on the plastic film, wherein the plastic film has a layer thickness in the range of 10 μm to 300 μm, wherein the ratio of the layer thicknesses of first outer film layer/carrier film layer/second outer film layer—varies in the range of 10-35: 40-60:10-35, in particular in the range of 15-30: 45-55:15-30;

wherein plastic film is transparent, in particular transparent with respect to the wavelength range of visible light, in particular wherein the transparent plastic film has a transparency of at least 70%, in particular of at least 75%, preferably of at least 80%, particularly preferably of at least 85%, very particularly preferably of at least 90%, even more preferably of at least 95%, in particular determined in accordance with DIN EN ISO 13468, and/or in particular where the transparent plastic film has an opacity of at most 30%, in particular at most 25%, preferably at most 20%, particularly preferably at most 15%, very particularly preferably at most 10%, even more preferably at most 5%, in particular determined in accordance with DIN 53146;

wherein the transparent plastic film contains primary plastic(s) of the same type of plastic according to DIN EN ISO 11469 as the plastic recyclate, in particular in quantities in the range from 0.1% by weight to 15% by weight, preferably in quantities in the range from 0.5% by weight to 10% by weight, preferably in quantities in the range from 1% by weight to 9% by weight, based on the plastic film. % by weight, based on the plastic film, and/or wherein at least one of the film layers, in particular at least two of the film layers, preferably all film layers, of the transparently formed plastic film contains primary plastic(s) of the same plastic grade according to DIN EN ISO 11469 as the plastic recyclate, in particular in amounts in the range from 0.1% by weight to 15% by weight, preferably in amounts in the range from 0.5% by weight to 10% by weight, preferably in amounts in the range from 1% by weight to 9% by weight, based on the respective film layer.

Furthermore, in particular, it is also an object of the present invention according to this aspect of the invention (i.e., in the case of a transparently formed plastic film according to the invention) to provide a multilayer plastic film, in particular multilayer plastic composite film, preferably multilayer plastic packaging film, based on recycled plastic (recycled plastic), in particular based on recycled plastic derived from waste, in particular multilayer plastic film as previously defined, preferably a transparent multilayer plastic film as previously defined, wherein the plastic film comprises a laminate of at least three film layers bonded to one another, in particular bonded and/or coextruded by means of coextrusion, wherein the plastic film and/or layered composite comprises a first outer film layer and a second outer film layer, and a carrier film layer disposed between the first outer film layer and the second outer film layer, wherein the plastic film has a plastic recyclate content of at least 80% by weight—, based on the plastic film, wherein the plastic film has a layer thickness in the range of 10 µm to 300 µm, wherein the ratio of the layer thicknesses of first outer film layer/carrier film layer/second outer film layer varies in the range of 10-35: 40-60:10-35, in particular in the range of 15-30: 45-55:15-30;

wherein plastic film is transparent, in particular transparent with respect to the wavelength range of visible light, in particular wherein the transparent plastic film has a transparency of at least 70%, in particular of at least 75%, preferably of at least 80%, particularly preferably of at least 85%, very particularly preferably of at least 90%, even more preferably of at least 95%, in particular determined in accordance with DIN EN ISO 13468, and/or in particular where the transparent plastic film has an opacity of at most 30%, in particular at most 25%, preferably at most 20%, particularly preferably at most 15%, very particularly preferably at most 10%, even more preferably at most 5%, in particular determined in accordance with DIN 53146;

wherein the transparent plastic film contains primary plastic(s) of the same type of plastic according to DIN EN ISO 11469 as the plastic recyclate, in particular in quantities in the range from 0.1% by weight to 15% by weight, preferably in quantities in the range from 0.5% by weight to 10% by weight, preferably in quantities in the range from 1% by weight to 9% by weight, based on the plastic film and/or wherein at least one of the film layers, in particular at least two of the film layers, preferably all film layers, of the transparently formed plastic film contains primary plastic(s) of the same plastic grade according to DIN EN ISO 11469 as the plastic recyclate, in particular in amounts in the range from 0.1% by weight to 15% by weight, preferably in amounts in the range from 0.5% by weight to 10% by weight, preferably in amounts in the range from 1% by weight to 9% by weight, based on the respective film layer;

wherein the film layers each comprise a plastic recyclate based on polyethylene (PE recyclate), wherein the film layers each comprise a plastic recyclate content of at least 80% by weight, based on the respective film layer, wherein the plastic recyclate based on polyethylene (PE recyclate) has a (polyethylene-)grade purity of at least 90% by weight, in particular at least 95% by weight, based on the plastic recyclate based on polyethylene, and the film layers additionally having primary polyethylene (polyethylene as and/or in the form of primary plastic), in particular in amounts in the range from 0.1% by weight to 15% by weight, in particular in amounts in the range from 0.5% by weight to 10% by weight, preferably in amounts in the range from 1% by weight to 9% by weight, based on the respective film layer.

In this context, it is particularly preferred if the primary polyethylene (polyethylene as and/or in the form of primary plastic) is selected from LDPE (Low Density Polyethylene) and LLDPE (Linear Low Density Polyethylene), especially LLDPE (Linear Low Density Polyethylene).

Overall, the multilayer plastic film according to the invention can thus be either transparent or opaque, in particular colored, according to the two alternative embodiments. As a result, the plastic film according to the invention can be used universally, in particular as a packaging film for a variety of different goods and products with correspondingly different packaging requirements.

For the production of the multilayer plastic film, plastic recyclate or recycled plastic is used, which is based on plastic waste. Obtaining a plastic recyclate suitable for producing the multilayer plastic film according to the invention can be done, for example, as follows:

First, the plastic waste is pre-sorted in the household by the consumer, especially in Germany in connection with the "Green Dot" waste collection and recycling system, according to which the plastic waste is collected in the yellow bag or the yellow garbage can or disposed of by the consumer. Subsequently, this plastic waste pre-sorted by the consumer in the household enters a sorting plant, which, preferably automatically, separates the plastic waste in a multi-stage process. First, the waste is sorted by size to simplify the further separation process. Then, for example, light materials such as films are sorted out in an air classifier so that the subsequent further sorting of the hard plastic can be carried out according to the corresponding plastic grade (i.e. plastic grade according to DIN EN ISO 11469). For this purpose, the hard plastic can be sorted step by step by a scanner, e.g. a near-infrared scanner, according to plastic type (i.e. for example PE, PP, PET, etc.) in a next step, whereby subsequent manual sorting can take place after the automatic sorting. Further sorting, e.g. by density or color, can also be carried out. The at least substantially unmixed plastic waste obtained in this way is usually shredded in a next step, in particular shredded, and then typically subjected to cleaning (usually washing) with subsequent drying. These at least substantially unmixed, shredded and cleaned plastic wastes can then also be subjected to further subsequent sorting according to their plastic type, optionally followed by preferably automatic color sorting (if color sorting has not already been carried out beforehand, e.g. before shredding or after cleaning, etc.).). The now at least essentially unmixed, in particular also color-matched, shredded and cleaned plastic waste is melted in an extruder, for example, then subjected to a final cleaning by means of a filter and processed into granules. This granulate finally obtained corresponds to the plastic recyclate used within the scope of the present invention.

The production of the multilayer plastic film according to the invention based on such a plastic recyclate can proceed, for example, as follows: First, the plastic recyclate is melted, for example in an extruder, with possible or optional further ingredients being added to the resulting melt, such as stabilizers, dyes or color pigments, primary plastics, anti-adhesive agents, etc. are added. This resulting melt is then continuously pressed out of a shaping opening or nozzle, preferably under pressure. Preferably, the so-called blown film extrusion is suitable for producing the multilayer plastic film according to the invention, in particular a corresponding film tube, in which the melt emerges from an annular die (from which the individual film layers emerge directly as a coextrudate and thus already as a film layer composite) in the form of a coextruded multilayer film tube and is generally discharged upwards. Since, according to the invention, the film is a multilayer plastic film, also called a coex (trusion) film, melts from several extruders are fed to the blow molding process, which are combined, in particular co-extruded, into a common film via a multilayer ring die. According to this technique, both tubular films and, in turn, semi-tubular films as well as flat films can be produced from them (by cutting open the tubular film), although the special design of the die may vary depending on the film to be produced (i.e. flat, tubular or semi-tubular film). Alternatively, especially in the case of multilayer flat films, slit-shaped outlet nozzles, in particular slit-shaped multilayer outlet nozzles, can also be used; also, (although less preferred according to the invention) in the case of multilayer flat films, the individual layers can first be extruded separately and subsequently laminated. The layer thickness of the multilayer plastic films produced can be varied by a variety of manufacturing parameters, for example by the extrusion pressure, the die shape and die slot size, the amount of air introduced during blown film extrusion, the amount of granules, the discharge or haul-off speed applied during extrusion, squeeze-off pressure, etc.

The production of multilayer plastic films by means of extrusion, in particular coextrusion, as described above in its main features is sufficiently known to the skilled person as such or per se, so that reference can be made to the general technical knowledge with regard to further relevant details.

A further object of the present invention—according to a second aspect of the present invention—is the use of a multilayer plastic film, as previously defined, for the production of packaging material and/or as packaging material.

In particular, according to this aspect of the present invention, it is preferred that the plastic film be in the form of a flat film, tubular film or semi-tubular film.

Further, according to a particular embodiment according to this aspect of the present invention, it may be provided that the plastic film is used in the form of outer packaging, tubes, bags or pouches.

According to a preferred embodiment according to this aspect of the invention, it is envisaged that the plastic film according to the invention is processed via automated filling and/or packaging equipment (e.g. FFS or VFFS equipment), preferably as so-called rollstock, in particular into the desired final packaging.

In the context of the use according to the invention, the plastic film according to the invention is preferably used as a so-called PCR plastic film.

Furthermore, according to another particular embodiment of this aspect of the present invention, it may be envisaged that the plastic film is used for packaging bulk goods, in particular selected from the group of (planting) soils, fertilizers, mulches, humus, detergents, adhesives, pellets, granulates, household goods and household products, or else for hygiene applications.

In accordance with this aspect of the present invention, it may be particularly envisaged that the plastic film is used for packaging purposes and/or as a packaging material in the non-food sector.

With respect to further details of the use of a multilayer plastic film according to the invention, reference is made to the foregoing explanations with respect to the multilayer plastic film according to the invention, which also apply accordingly to this aspect of the present invention.

Furthermore, it is also an object of the present invention—according to a third aspect of the present invention—to provide a packaging material comprising at least one multilayer plastic film as previously defined.

In particular, according to this aspect of the present invention, it is preferred if the packaging material and/or the plastic film is/are in the form of outer packaging, tubes, bags or pouches.

According to a particular embodiment of this aspect of the invention, it may be provided in particular that the packaging material and/or the plastic film is/are designed for packaging bulk goods, in particular selected from the group of (planting) soils, fertilizers, mulches, humus, detergents, adhesives, pellets, granulates, household goods and household products, or else for hygiene applications.

According to a further particular embodiment of this aspect of the invention, it may equally be provided that the packaging material and/or the plastic film is/are designed for packaging purposes and/or as packaging material in the non-food sector.

With respect to further details of the packaging material according to the invention, reference is made to the foregoing explanations with respect to the multilayer plastic film according to the invention and its use, which also apply accordingly to this aspect of the present invention.

In the following, the invention will be explained in more detail by means of a FIGURE representation showing only one example of an embodiment. In the single drawing shows:

FIG. 1 is a schematic cross-sectional view of a multilayer plastic film according to a particular embodiment of the present invention.

The single FIGURE, FIG. 1, shows a multilayer plastic film 1 according to the invention, the plastic film comprising a laminate of three interconnected film layers 1*a*, 1*b*, 1*c*, the plastic film 1 or laminate comprising an outer film layer 1*a* and a second outer film layer 1*c* and a carrier film layer 1*b* arranged between the first outer film layer 1*a* and the second outer film layer 1*c*.

According to the invention, according to FIG. 1, in particular a multilayer plastic film 1, in particular multilayer plastic composite film, preferably multilayer plastic packaging film, based on recycled plastic (recycled plastic), in particular based on recycled plastic originating from waste, is provided, wherein the plastic film 1 comprises a layer composite of at least three interconnected film layers 1a, 1b, 1c, in particular interconnected and/or coextruded by means of coextrusion, the plastic film 1 and/or the layered composite comprising a first outer film layer 1a and a second outer film layer 1c and a carrier film layer 1b arranged between the first outer film layer 1a and the second outer film layer 1c, the plastic film 1 having a plastic recyclate content of at least 80% by weight, based on the plastic film 1.

Furthermore, FIG. 1 that in the embodiment specifically illustrated therein, the layer thickness of the carrier film layer 1b can be 35% to 65%, in particular 40% to 60%, preferably 45% to 55%, more preferably about 50%, of the (total) layer thickness of the plastic film 1, while the (summed) layer thicknesses of the outer film layers 1a, 1c can be 35% to 65%, in particular 40% to 60%, preferably 45% to 55%, more preferably about 50%, of the (total) layer thickness of the plastic film 1. In other words, according to this particular embodiment of the present invention as shown in FIG. 1, the ratio of the layer thicknesses, i.e. the layer thickness ratio first outer film layer 1a/carrier film layer 1b/second outer film layer 1c, can vary in the range of 10-35: 40-60:10-35, in particular in the range of 15-30: 45-55:15-30.

Such a design of the multilayer plastic film according to the invention enables particularly high stability and efficient tailoring of the end properties with respect to the corresponding application.

For further details, please refer to the above explanations, which apply accordingly to the FIGURE illustration.

Further embodiments, modifications and variations of the present invention are readily apparent or realizable to those skilled in the art upon reading the description without departing from the scope of the present invention.

The present invention is illustrated with reference to the following embodiments, which are not intended to limit the present invention in any way, but merely to explain exemplary and non-limiting methods of implementation and embodiments of the present invention.

EXAMPLES

Abbreviations Used
PE recyclate: Plastic recyclate based on polyethylene, in particular with a grade purity of at least 90 wt %.
Primary PE: polyethylene newly produced from fossil raw materials
AMF 715: Lubricant; POLYBATCH® AMF 715 HF-IP, Company A. Schulman/LyondellBasell
white 8750 ES: white color; POLYWHITE® 8570 ES, Company A. Schulman/LyondellBasell
silver 7030: silver color; POLYBATCH® 7030, company A. Schulman/LyondellBasell
black 2723 black color; POLYBLACK® 2723 Pm, company A. Schulman/LyondellBasell
UV stabilizer: POLYBATCH® UV 1952, Company A. Schulman/LyondellBasell
Production of Plastic Films According to the Invention
For the production of multilayered (here specifically: in each case three-layered) plastic films according to the present invention (i.e. PCR plastic films) with a plastic recyclate content in each case of at least 80% by weight, based on the plastic film, according to particular embodiments of the present invention, the procedure is as follows:

In a manner previously disclosed in the context of the description, PE type-pure, shredded and cleaned PE plastic waste is first processed and obtained (PE type purity within the meaning of DIN EN ISO 11469 of at least 95% by weight, based on the PE plastic waste), which is subsequently processed in a manner known per se into a polyethylene-based plastic recyclate in the form of a granulate (PE recyclate with PE type purity 95% by weight, based on the PE recyclate).

Subsequently, this granular PE recyclate (polyethylene-based PCR plastic recyclate) is processed by adding further desired ingredients (e.g. stabilizers, in particular UV stabilizers, color pigments and optionally also lubricants in the case of opaque or colored plastic films or primary polyethylene and anti-adhesive agents in the case of transparent plastic films, etc.) in a manner known per se and previously disclosed within the scope of the description by means of blown film extrusion using a multilayer ring die to form the corresponding three-layer PE recyclate films (PE-recyclate content or PCR content based on PE in each case 80 wt. %, based on the plastic film) are processed. The tubular films obtained can also be further processed into semi-tubular films and flat films in a manner known per se.

The plastic films obtained in this way according to the present invention and their composition and properties are described below. Due to their high environmental compatibility, in particular due to the high PE recyclate content of 80% in each case, the plastic films according to the invention can be labeled and advertised accordingly when they are used (e.g. in Germany with the "Blue Angel" environmental label).

All the plastic films produced according to the invention have a three-layer structure
first outer film layer 1a/carrier film layer 1c/second outer film layer 1c
according to FIG. 1.

Plastic films according to the invention are produced with film thicknesses in the range from 35 µm to 150 µm. The ratio of the layer thicknesses of first outer film layer/carrier film layer/second outer film layer is also varied.

1. Transparent Flat Films

In the process described above, transparent flat films with total layer thicknesses of 35 µm, 50 µm, 80 µm and 120 µm are produced with the composition described in Table 1. The flat films each have a ratio of the layer thicknesses of first outer film layer/carrier film layer/second outer film layer of 25:50:25.

TABLE 1

Composition of the respective layers of transparent flat films according to the invention

| Raw material | first outer film layer | Carrier film layer | second outer film layer |
|---|---|---|---|
| PE recyclate | 90.5% | 91.0% | 90.5% |
| Primary PE | 9.0% | 9.0% | 9.0% |
| AMF 715 | 0.5% | — | 0.5% |

2. Transparent Tubular and Semi-Tubular Films

In the process described above, transparent tubular and semi-tubular films with total layer thicknesses of 35 µm, 50 µm, 80 µm and 120 µm are produced with the composition described in Table 2. The plastic films each have a ratio of the layer thicknesses of first outer film layer/carrier film layer/second outer film layer of 25:50:25, with the second outer film layer representing the inside of the tubular and semi-tubular films.

TABLE 2

Composition of the respective layers of transparent tubular and semi-tubular films according to the invention

| Raw material | first outer film layer | Carrier film layer | second outer film layer |
|---|---|---|---|
| PE recyclate | 90.5% | 91.0% | 85.5% |
| Primary PE | 9.0% | 9.0% | 9.0% |
| AMF 715 | 0.5% | — | 0.5% |
| Chalk | — | — | 5.0% |

3. White/White/Silver Flat. Tubular and Semi-Tubular Films (Opaque Films)

In the process described above, opaque plastic films, in particular both flat films and tubular and semi-tubular films, are produced in each case with total layer thicknesses of 50 μm, 80 μm, 120 μm and 150 μm with the composition described in Table 3. In this context, the first outer film layer and the carrier film layer are formed white, and the second outer film layer is formed silver, with the second outer film layer representing the inner side in the case of the tubular and semi-tubular films. The plastic films each have a ratio of the layer thicknesses of first outer film layer/carrier film layer/second outer film layer of 28:50:22.

TABLE 3

Composition of the respective layers of white/white/silver flat, tubular and semi-tubular films according to the invention

| Raw material | first outer film layer | Carrier film layer | second outer film layer |
|---|---|---|---|
| PE recyclate | 93.0% | 88.0% | 88.0% |
| white 8750 ES | 5.0% | 10.0% | — |
| silver 7030 | — | — | 10.0% |
| UV stabilizer | 2.0% | 2.0% | 2.0% |

4. White/White/Black Flat, Tubular and Semi-Tubular Films (Opaque Films)

In the process described above, opaque plastic films, in particular both flat films and tubular and semi-tubular films, are produced in each case with total layer thicknesses of 50 μm, 80 μm, 120 μm and 150 μm with the composition described in Table 4. In this context, the first outer film layer and the carrier film layer are formed white, and the second outer film layer is formed black, with the second outer film layer representing the inner side in the case of the tubular and semi-tubular films. The plastic films each have a ratio of the layer thicknesses of first outer film layer/carrier film layer/second outer film layer of 28:50:22.

TABLE 4

Composition of the respective layers of white/white/black flat, tubular and semi-tubular films according to the invention

| Raw material | first outer film layer | Carrier film layer | second outer film layer |
|---|---|---|---|
| PE recyclate | 93.0% | 88.0% | 88.0% |
| white 8750 ES | 5.0% | 10.0% | — |
| black 2723 | — | — | 10.0% |
| UV stabilizer | 2.0% | 2.0% | 2.0% |

Mechanical and Optical Properties

The mechanical properties, in particular the tensile strength in longitudinal and transverse direction, the elongation at break in longitudinal and transverse direction, the dynamic puncture resistance as well as the coefficients of friction of the untreated and the roughened films, the produced flat, tubular and semi-tubular films are tested. In addition, the opacity of the white/white/silver and white/white/black films is measured.

In this context, the following test procedures are used to measure the properties:
Tensile strength: Tensile test according to EN ISO 527
Elongation at break: tensile test according to EN ISO 527
Dynamic puncture resistance: Dart drop test according to ASTM D 1709
Coefficients of friction: Friction test on metal according to DIN 53375, with any necessary roughening of the foils by means of corona treatment.
Transparency: light transmission according to DIN EN ISO 13468
Opacity: Opacity measurement according to DIN 53146

All flat, tubular and semi-tubular films produced meet the minimum requirements specified below that are necessary for use as packaging films:

| Mechanical property | Minimum requirements |
|---|---|
| Tensile strength in longitudinal direction | 19 N/mm$^2$ |
| Tensile strength in transverse direction | 17 N/mm2 |
| Elongation at break in longitudinal direction | 200% |
| Elongation at break in transverse direction | 250% |
| dynamic puncture resistance | 1.7 g/μm |
| Transparency (only for transparent foils) | 85% |
| Opacity (only for opaque films) | 96% |

Furthermore, the produced and untreated flat, tubular and semi-tubular films, according to the requirements for use as packaging film, have a coefficient of friction on metal of 0.45 at the most. Furthermore, the produced flat, tubular and semi-tubular films have a coefficient of friction on metal of maximum 0.45 after corona treatment, according to the requirements for use as packaging film.

Overall, therefore, all the plastic films produced and according to the invention meet the requirements for use as or in packaging material. Furthermore, all plastic films have a plastic recyclate content of more than 80% by weight, based on the plastic film.

Despite the use of a high plastic recyclate content of over 80% by weight, the result is high-performance three-layer PE coextruded films that meet the requirements for use as packaging films.

| List of reference signs: | |
|---|---|
| 1 | multilayer plastic film |
| 1a | first outer film layer |
| 1b | support film layer |
| 1c | second outer film layer |

The invention claimed is:
1. A multilayer plastic composite film based on recycled plastic,
wherein the multilayer plastic composite film comprises a layer composite of at least three film layers each made of plastic and bonded to one another by means of coextrusion, wherein the layer composite comprises a first outer film layer and a second outer film layer and a carrier film layer arranged between the first outer film layer and the second outer film layer, wherein the multilayer plastic composite film has a recycled plastic content of at least 80 wt. % based on the multilayer plastic composite film, wherein the multilayer plastic film composite comprises at least substantially only one single plastic grade in accordance with to DIN EN ISO 11469, said plastic grade having a grade purity of at least 90 wt. %, wherein the multilayer plastic composite film has a ratio of layer thicknesses of first outer film layer/carrier film layer/second outer film layer varying in a range of 10-35:40-60:10-35, with at least two of the three film layers having different mechanical properties each.

2. The multilayer plastic composite film according to claim 1,
wherein the different mechanical properties of the at least two of the three film layers are selected among (i) different tensile strengths in at least one of the longitudinal and transverse directions, (ii) different elongations at break in one of the longitudinal and transverse directions, (iii) different dynamic puncture strengths and (iv) different coefficients of friction as well as combinations thereof.

3. The multilayer plastic composite film according to claim 1,
wherein the multilayer plastic composite film, in addition to the recycled plastic, comprises only ingredients selected from the group consisting of fillers, colorants, color pigments, fragrances, antiblocking agents, lubricants, stabilizers, plasticizers, binders, primary or virgin plastics of the same plastic grade according to DIN EN ISO 11469 as the recycled plastic, auxiliaries and additives as well as mixtures and combinations thereof.

4. The multilayer plastic composite film according to claim 1,
wherein the multilayer plastic composite film has a total plastic content in the range from 80 wt. % to 99.9 wt. %, based on the multilayer plastic composite film.

5. The multilayer plastic composite film according to claim 1,
wherein the multilayer plastic composite film comprises ingredients selected from the group consisting of fillers, colorants, color pigments, fragrances, antiblocking agents, lubricants, stabilizers, plasticizers, binders, auxiliaries and additives as well as mixtures and combinations thereof, in total amounts in the range from 0.1 wt. % to 20 wt. %, based on the multilayer plastic composite film.

6. The multilayer plastic composite film according to claim 1, wherein the multilayer plastic composite film comprises or consists of:
recycled plastic in amounts in the range from 80 wt. % to 97 wt. %,
optionally primary or virgin plastic(s) of the same type of plastic according to DIN EN ISO 11469 as the plastic recyclate, in amounts in the range from 0.1 wt. % to 15 wt. %,
ingredients selected from the group consisting of fillers, colorants, color pigments, fragrances, antiblocking agents, lubricants, stabilizers, plasticizers, binders, auxiliaries and additives as well as mixtures and combinations thereof, in total amounts in the range from 0.1 wt. % to 20 wt. %;

wherein all weight percentages are each related to the multilayer plastic composite film and are to be combined and selected in such a way that 100 wt. % results.

7. The multilayer plastic composite film according to claim 1,
wherein the multilayer plastic composite film has a layer thickness in the range from 10 μm to 300 μm.

8. The multilayer plastic composite film according to claim 1,
wherein the multilayer plastic composite film has a layer thickness of at least 10 μm.

9. The multilayer plastic composite film according to claim 1,
wherein the multilayer plastic composite film has a layer thickness of up to 300 μm.

10. The multilayer plastic composite film according to claim 1,
wherein the layer thickness of the carrier film layer is 35% to 65% of the total layer thickness of the multilayer plastic composite film.

11. The multilayer plastic composite film according to claim 1,
wherein the summed layer thicknesses of the outer film layers is 35 % to 65% of the total layer thickness of the multilayer plastic composite film.

12. The multilayer plastic composite film according to claim 1,
wherein the layer thickness of the carrier film layer is 35% to 65% of the total layer thickness of the multilayer plastic composite film and
wherein the summed layer thicknesses of the outer film layers is 35% to 65% of the total layer thickness of the multilayer plastic composite film.

13. The multilayer plastic composite film according to claim 1,
wherein the ratio of the layer thicknesses of first outer film layer/carrier film layer/second outer film layer varies in the range of 15-30:45-55:15-30.

14. The multilayer plastic composite film according to claim 1,
wherein the film layers each have a recycled plastic content of at least 80 wt. %.

15. The multilayer plastic composite film according to claim 1,
wherein the film layers each comprise a recycled plastic based on polyethylene, wherein the film layers each have a recycled plastic content of at least 80 wt. %.

16. The multilayer plastic composite film according to claim 15
wherein the recycled plastic based on polyethylene has a polyethylene grade purity of at least 90 wt. % based on the recycled plastic.

17. The multilayer plastic composite film according to claim 15 wherein the film layers additionally comprise primary or virgin polyethylene in amounts in the range from 0.1 wt. % to 15 wt. % based on the film layer.

18. The multilayer plastic composite film according to claim 1,
wherein at least two of the three film layers each have different optical properties selected among opacity and coloration.

19. A multilayer plastic composite film based on recycled plastic,
wherein the multilayer plastic composite film comprises a layer composite of at least three film layers each made of plastic and bonded to one another by means of coextrusion, wherein the layer composite comprises a first outer film layer and a second outer film layer and a carrier film layer arranged between the first outer film layer and the second outer film layer, wherein the multilayer plastic composite film has a recycled plastic content of at least 80 wt. % based on the plastic film, wherein the multilayer plastic composite film comprises at least substantially only one single plastic grade in accordance with to DIN EN ISO 11469, said plastic grade having a grade purity of at least 90 wt. %, wherein the multilayer plastic composite film has a ratio of layer thicknesses of first outer film layer/carrier film layer/second outer film layer varying in a range of 10-35:40-60:10-35, with at least two of the three film layers having different mechanical properties each;

wherein the multilayer plastic composite film has a layer thickness in the range of 10 μm to 300 μm, wherein the multilayer plastic composite film is opaque with respect to the wavelength range of visible light, wherein the multilayer plastic composite film has an opacity of at least 80% in accordance with DIN 53146;

wherein at least two film layers of the multilayer plastic composite film comprise mutually different coloring ingredients and have mutually different colors.

20. A multilayer plastic composite film based on recycled plastic, wherein the multilayer plastic composite film comprises a layer composite of at least three film layers each made of plastic and bonded to one another by means of coextrusion, wherein the layer composite comprises a first outer film layer and a second outer film layer and a carrier film layer arranged between the first outer film layer and the second outer film layer, wherein the multilayer plastic composite film has a recycled plastic content of at least 80 wt. % based on the multilayer plastic composite film, wherein the multilayer plastic composite film comprises only one single plastic grade in accordance with to DIN EN ISO 11469, said plastic grade having a grade purity of at least 90 wt. %, wherein the multilayer plastic composite film has a ratio of layer thicknesses of first outer film layer/carrier film layer/second outer film layer varying in a range of 10-35:40-60:10-35, with at least two of the three film layers having different mechanical properties each;

wherein the multilayer plastic composite film has a layer thickness in the range of 10 μm to 300 μm, wherein the first outer film layer and the carrier film layer each comprise a white pigment and are each formed in white color and wherein the first outer film layer and the carrier film layer and wherein the second outer film layer comprises a coloring pigment selected among metal effect pigments and black pigments and is metal-colored or black.

21. A multilayer plastic composite film based on recycled plastic, wherein the multilayer plastic composite film comprises a layer composite of at least three film layers each made of plastic and bonded to one another by means of coextrusion, wherein the layer composite comprises a first outer film layer and a second outer film layer and a carrier film layer arranged between the first outer film layer and the second outer film layer, wherein the multilayer plastic composite film has a recycled plastic content of at least 80 wt. % based on the multilayer plastic composite film, wherein the multilayer plastic composite film comprises only one single plastic grade in accordance with to DIN EN ISO 11469, said plastic grade having a grade purity of at least 90 wt. %, wherein the multilayer plastic composite film has a ratio of layer thicknesses of a first outer film layer/carrier film layer/second outer film layer varying in a range of 10-35:40-60:10-35, with at least two of the three film layers having different mechanical properties each;

wherein the multilayer plastic composite film has a layer thickness in the range of 10 μm to 300 μm, wherein the multilayer plastic composite film is transparent with respect to the wavelength range of visible light wherein the multilayer plastic composite film has a transparency of at least 70% in accordance with DIN EN ISO 13468 or an opacity of at most 30% in accordance with DIN 53146.

22. The multilayer plastic composite film according to claim 1,
wherein the multilayer plastic composite film is designed as a packaging material.

23. The multilayer plastic composite film according to claim 1,
wherein the multilayer plastic composite film is in the form of a flat film, a tubular film or a semi-tubular film.

24. The multilayer plastic composite film according to claim 1,
wherein the multilayer plastic composite film is in the form of outer packagings, tubes, bags or sachets.

25. The multilayer plastic composite film according to claim 1,
wherein the multilayer plastic composite film is designed as a packaging material in the non-food sector.

26. The multilayer plastic composite film according to claim 1,
wherein the multilayer plastic composite film is designed as a packaging material for packaging bulk goods selected from the group consisting of soils, fertilizers, mulch, humus, detergents, adhesives, pellets, granulates, household goods, household products and products for hygiene applications.

27. A packaging material comprising at least one multilayer plastic composite film based on recycled plastic, wherein the multilayer plastic composite film comprises a layer composite of at least three film layers each made of plastic and bonded to one another by means of coextrusion, wherein the layer composite comprises a first outer film layer and a second outer film layer and a carrier film layer arranged between the first outer film layer and the second outer film layer, wherein the multilayer plastic composite film has a recycled plastic content of at least 80 wt. % based on the multilayer plastic composite film, wherein the multilayer plastic composite film comprises only one single plastic grade in accordance with to DIN EN ISO 11469, said plastic grade having a grade purity of at least 90 wt. %, wherein the multilayer plastic composite film has a ratio of layer thicknesses of first outer film layer/carrier film layer/second outer film layer varying in a range of 10-35:40-60:10-35, with at least two of the three film layers having different mechanical properties each.

* * * * *